US00RE44468E

(19) United States
(12) Reissued Patent
Chu

(10) Patent Number: US RE44,468 E
(45) Date of Reissued Patent: *Aug. 27, 2013

(54) DATA SECURITY METHOD AND DEVICE FOR COMPUTER MODULES

(75) Inventor: William W. Y. Chu, Los Altos, CA (US)

(73) Assignee: Acqis LLC, McKinney, TX (US)

( * ) Notice: This patent is subject to a terminal disclaimer.

(21) Appl. No.: 13/562,210

(22) Filed: Jul. 30, 2012

Related U.S. Patent Documents

Reissue of:

(64) Patent No.: 6,643,777
Issued: Nov. 4, 2003
Appl. No.: 09/312,199
Filed: May 14, 1999

U.S. Applications:

(63) Continuation of application No. 13/294,108, filed on Nov. 10, 2011, now Pat. No. Re. 43,602, which is a continuation of application No. 12/561,138, filed on Sep. 16, 2009, now Pat. No. Re. 42,984, which is a continuation of application No. 11/056,604, filed on Feb. 10, 2005, now Pat. No. Re. 41,092.

(51) Int. Cl.
*G06F 12/00* (2006.01)

(52) U.S. Cl.
USPC ..... 726/16; 726/20

(58) Field of Classification Search
USPC ..... 726/2–9, 16–21, 34, 36; 713/182–183, 713/192–194; 710/1, 7, 8, 15, 20, 22, 100
See application file for complete search history.

(56) References Cited

U.S. PATENT DOCUMENTS

| | | | | |
|---|---|---|---|---|
| 4,623,964 | A * | 11/1986 | Getz et al. | 705/1 |
| 4,769,764 | A | 9/1988 | Levanon | |
| 4,799,258 | A | 1/1989 | Davies | |
| 5,056,141 | A * | 10/1991 | Dyke | 340/5.27 |
| 5,086,499 | A | 2/1992 | Mutone | |
| 5,103,446 | A | 4/1992 | Fischer | |
| 5,191,581 | A | 3/1993 | Woodbury et al. | |
| 5,198,806 | A | 3/1993 | Lord | |
| 5,319,771 | A | 6/1994 | Takeda | |
| 5,463,742 | A | 10/1995 | Kobayashi | |
| 5,519,843 | A | 5/1996 | Moran et al. | |
| 5,539,616 | A | 7/1996 | Kikinis | |

(Continued)

FOREIGN PATENT DOCUMENTS

| | | |
|---|---|---|
| EP | 0722138 A1 | 7/1996 |
| JP | 6-289953 | 10/1994 |

(Continued)

OTHER PUBLICATIONS

Boosten, "Transmission Overhead and Optimal Packet Size", Mar. 11, 1998, printed on: Jan. 28, 2011, 2 pgs.

*Primary Examiner* — Hosuk Song
(74) *Attorney, Agent, or Firm* — Cooley LLP

(57) ABSTRACT

A security method for an attached computer module in a computer system. The security method reads a security identification number in an attached computer module and compares it to a security identification number in a console, which houses the attached computer module. Based upon a relationship between these numbers, a security status is selected. The security status determines the security level of operating the computer system.

36 Claims, 24 Drawing Sheets

(56) References Cited

U.S. PATENT DOCUMENTS

| | | | | |
|---|---|---|---|---|
| 5,546,463 | A | 8/1996 | Caputo et al. | |
| 5,550,861 | A | 8/1996 | Chan et al. | |
| 5,572,441 | A | 11/1996 | Boie | |
| 5,590,377 | A | 12/1996 | Smith | |
| 5,608,608 | A | 3/1997 | Flint et al. | |
| 5,623,637 | A | 4/1997 | Jones et al. | |
| 5,638,521 | A | 6/1997 | Buchala et al. | |
| 5,640,302 | A | 6/1997 | Kikinis | |
| 5,648,762 | A | 7/1997 | Ichimura et al. | |
| 5,689,654 | A | 11/1997 | Kikinis et al. | |
| 5,721,842 | A | 2/1998 | Beasley et al. | |
| 5,751,711 | A | 5/1998 | Sakaue | |
| 5,751,950 | A | 5/1998 | Crisan | |
| 5,764,924 | A | 6/1998 | Hong | |
| 5,774,704 | A | 6/1998 | Williams | |
| 5,815,681 | A | 9/1998 | Kikinis | |
| 5,838,932 | A | 11/1998 | Alzien | |
| 5,857,085 | A | 1/1999 | Zhang et al. | |
| 5,862,381 | A | 1/1999 | Advani et al. | |
| 5,878,211 | A | 3/1999 | Delagrange et al. | |
| 5,884,049 | A | 3/1999 | Atkinson | |
| 5,907,566 | A | 5/1999 | Benson et al. | |
| 5,909,559 | A | 6/1999 | So | |
| 5,933,609 | A | 8/1999 | Walker et al. | |
| 5,935,226 | A | 8/1999 | Klein | |
| 5,941,965 | A | 8/1999 | Moroz et al. | |
| 5,974,486 | A | 10/1999 | Siddappa | |
| 5,978,919 | A | 11/1999 | Doi et al. | |
| 5,991,833 | A | 11/1999 | Wandler et al. | |
| 5,999,476 | A | 12/1999 | Dutton et al. | |
| 5,999,952 | A | 12/1999 | Jenkins et al. | |
| 6,006,243 | A | 12/1999 | Karidis | |
| 6,012,145 | A | 1/2000 | Mathers et al. | |
| 6,025,989 | A | 2/2000 | Ayd et al. | |
| 6,029,183 | A | 2/2000 | Jenkins et al. | |
| 6,038,621 | A | 3/2000 | Gale et al. | |
| 6,046,571 | A | 4/2000 | Bovio et al. | |
| 6,069,615 | A | 5/2000 | Abraham et al. | |
| 6,070,214 | A | 5/2000 | Ahern | |
| 6,104,921 | A | 8/2000 | Cosley et al. | |
| 6,157,534 | A | 12/2000 | Gallagher et al. | |
| 6,161,157 | A | 12/2000 | Tripathi | |
| 6,161,524 | A | 12/2000 | Akbarian et al. | |
| 6,199,134 | B1 | 3/2001 | Deschepper et al. | |
| 6,202,115 | B1 * | 3/2001 | Khosrowpour | 710/312 |
| 6,202,169 | B1 | 3/2001 | Razzaghe-Ashrafi et al. | |
| 6,216,185 | B1 | 4/2001 | Chu | |
| 6,226,700 | B1 | 5/2001 | Wandler et al. | |
| 6,256,689 | B1 | 7/2001 | Khosrowpour | |
| 6,266,539 | B1 | 7/2001 | Pardo | |
| 6,301,637 | B1 | 10/2001 | Krull et al. | |
| 6,304,895 | B1 | 10/2001 | Schneider et al. | |
| 6,311,268 | B1 | 10/2001 | Chu | |
| 6,314,522 | B1 | 11/2001 | Chu | |
| 6,321,335 | B1 | 11/2001 | Chu | |
| 6,324,605 | B1 | 11/2001 | Rafferty et al. | |
| 6,332,180 | B1 | 12/2001 | Kauffman et al. | |
| 6,345,330 | B2 | 2/2002 | Chu | |
| 6,366,951 | B1 | 4/2002 | Schmidt | |
| 6,378,009 | B1 | 4/2002 | Pinkston, II et al. | |
| 6,381,602 | B1 * | 4/2002 | Shoroff et al. | 707/9 |
| 6,393,561 | B1 * | 5/2002 | Hagiwara et al. | 713/100 |
| 6,401,124 | B1 | 6/2002 | Yang et al. | |
| 6,452,790 | B1 | 9/2002 | Chu | |
| 6,453,344 | B1 | 9/2002 | Ellsworth et al. | |
| 6,460,106 | B1 | 10/2002 | Stufflebeam | |
| 6,487,614 | B2 * | 11/2002 | Nobutani et al. | 710/20 |
| 6,496,361 | B2 * | 12/2002 | Kim et al. | 361/683 |
| 6,549,966 | B1 | 4/2003 | Dickens et al. | |
| 6,643,777 | B1 | 11/2003 | Chu | |
| 6,718,415 | B1 | 4/2004 | Chu | |
| 7,099,981 | B2 | 8/2006 | Chu | |
| 7,146,446 | B2 | 12/2006 | Chu | |
| 7,328,297 | B2 | 2/2008 | Chu | |
| 7,363,415 | B2 | 4/2008 | Chu | |
| 7,363,416 | B2 | 4/2008 | Chu | |
| 7,376,779 | B2 | 5/2008 | Chu | |
| RE41,076 | E | 1/2010 | Chu | |
| RE41,092 | E | 1/2010 | Chu | |
| 7,676,624 | B2 | 3/2010 | Chu | |
| RE41,294 | E | 4/2010 | Chu | |
| 7,818,487 | B2 | 10/2010 | Chu | |
| RE41,961 | E | 11/2010 | Chu | |
| RE42,814 | E | 10/2011 | Chu | |
| 8,041,873 | B2 | 10/2011 | Chu | |
| RE42,984 | E | 11/2011 | Chu | |
| RE43,119 | E | 1/2012 | Chu | |
| RE43,171 | E | 2/2012 | Chu | |
| 8,234,436 | B2 | 7/2012 | Chu | |
| 2001/0011312 | A1 | 8/2001 | Chu | |
| 2004/0177200 | A1 | 9/2004 | Chu | |
| 2005/0174729 | A1 | 8/2005 | Chu | |
| 2005/0182882 | A1 | 8/2005 | Chu | |
| 2005/0195575 | A1 | 9/2005 | Chu | |
| 2005/0204083 | A1 | 9/2005 | Chu | |
| 2005/0246469 | A1 | 11/2005 | Chu | |
| 2006/0265361 | A1 | 11/2006 | Chu | |
| 2008/0244149 | A1 | 10/2008 | Chu | |
| 2009/0157939 | A1 | 6/2009 | Chu | |
| 2010/0174844 | A1 | 7/2010 | Chu | |
| 2011/0208893 | A1 | 8/2011 | Chu | |

FOREIGN PATENT DOCUMENTS

| | | |
|---|---|---|
| WO | WO 92/18924 | 10/1992 |
| WO | WO 94/00970 | 1/1994 |
| WO | WO 95/13640 | 5/1995 |

* cited by examiner

Attached Computer Module with Integrated CPU/NB/Graphics and Integrated HIC/SB

Attached Computer Module with Single Chip fully integrated: CPU, Cache, Core logic, Graphics controller and Interface controller

| Pin No. | Symbol | Signal | Standard | Description |
|---|---|---|---|---|
| P2 | PDR0 + | LVDS | | Peripheral data reverse 0 + |
| P3 | PDR0 - | LVDS | | Peripheral data reverse 0 - |
| P5 | PDR1 + | LVDS | | Peripheral data reverse 1 + |
| P6 | PDR1 - | LVDS | | Peripheral data reverse 1 - |
| P8 | PDR2 + | LVDS | | Peripheral data reverse 2 + |
| P9 | PDR2 - | LVDS | | Peripheral data reverse 2 - |
| P11 | PCKR + | LVDS | | Peripheral clock reverse + |
| P12 | PCKR - | LVDS | | Peripheral clock reverse - |
| P15 | PDR3 + | LVDS | | Peripheral data reverse 3 + |
| P16 | PDR3 - | LVDS | | Peripheral data reverse 3 - |
| P18 | PCNR + | LVDS | | Peripheral control reverse + |
| P19 | PCNR - | LVDS | | Peripheral control reverse - |
| P24 | PD0 + | LVDS | | Peripheral data 0 + |
| P25 | PD0 - | LVDS | | Peripheral data 0 - |
| P27 | PD1 + | LVDS | | Peripheral data 1 + |
| P28 | PD1 - | LVDS | | Peripheral data 1 - |
| P30 | PD2 + | LVDS | | Peripheral data 2 + |
| P31 | PD2 - | LVDS | | Peripheral data 2 - |
| P33 | PCK + | LVDS | | Peripheral clock + |
| P34 | PCK - | LVDS | | Peripheral clock - |
| P37 | PD3 + | LVDS | | Peripheral data 3 + |
| P38 | PD3 - | LVDS | | Peripheral data 3 - |
| P40 | PCN + | LVDS | | Peripheral control + |
| P41 | PCN - | LVDS | | Peripheral Control - |
| P13 | Config 0 | Static | 3.3v or GND | Configuration bit 0 |
| P35 | Config 1 | Static | 3.3v or GND | Configuration bit 1 |
| P1,P4,P7,P10, | | | | |
| P14,P17,P23,P26, | | | | |
| P29,P32,P36,P39 | GND | | GND | Ground |

FIG. 21

| Pin No. | Symbol | Signal | Standard | Description |
|---|---|---|---|---|
| V2 | Red Video | Analog | | Video |
| V4 | Green Video | Analog | | Video |
| V6 | Blue Video | Analog | | Video |
| V8 | HSYNC | | | Horizontal Sync |
| V9 | VSYNC | | | Vertical Sync |
| V11 | DDC2 SCL | | VESA DDC std 2 | DDC Clock |
| V12 | DDC2 SDA | | VESA DDC std 2 | DDC Data |
| V14 | TV-CV/CNTL 0 | | | TV Composite Video |
| V15 | SV Y/CNTL 1 | | Super Video | SV Luminance or Control 1 |
| V16 | SV C/CNTL 2 | | Super Video | SV Chrominance or Control 2 |
| V24 | D0 + | TMDS | VESA P & D | Data 0 + |
| V25 | D0 - | TMDS | VESA P & D | Data 0 - |
| V27 | CLK + | TMDS | VESA P & D | Clock + |
| V28 | CLK - | TMDS | VESA P & D | Clock - |
| V30 | D1 + | TMDS | VESA P & D | Data 1 + |
| V31 | D1 - | TMDS | VESA P & D | Data 1 - |
| V33 | D2 + | TMDS | VESA P & D | Data 2 + |
| V34 | D2 - | TMDS | VESA P & D | Data 2 - |
| V37 | VPCK + | LVDS | | Video Port Pixel Clock + |
| V38 | VPCK - | LVDS | | Video Port Pixel Clock - |
| V40 | VPD + | LVDS | | Video Port Pixel Data + |
| V41 | VPD - | LVDS | | Video Port Pixel Data - |
| V13 | Config 2 | | 3.3v or GND | Configuration bit 2 |
| V35 | Config 3 | | 3.3v or GND | Configuration bit 3 |
| V1,V3,V5,V7, V10,V23,V26, V29,V32,V36, V39,V42,V43, V44 | GND | | GND | Ground |

FIG. 22

| | Symbol | Signal | Data Rate | Description |
|---|---|---|---|---|
| 1 | PD0 RTN | | | GND |
| 2 | PD0 + | Synch. To PCK | 10 x clock rate | Computer to Peripheral LVDS Data 0 + |
| 3 | PD0 - | | | Computer to Peripheral LVDS Data 0 - |
| 4 | PD1 RTN | | | GND |
| 5 | PD1 + | Synch. To PCK | 10 x clock rate | Computer to Peripheral LVDS Data 1 + |
| 6 | PD1 - | | | Computer to Peripheral LVDS Data 1 - |
| 7 | PD2 RTN | | | GND |
| 8 | PD2 + | Synch. To PCK | 10 x clock rate | Computer to Peripheral LVDS Data 2 + |
| 9 | PD2 - | | | Computer to Peripheral LVDS Data 2 - |
| 10 | PD3 RTN | | | GND |
| 11 | PD3 + | Synch. To PCK | 10 x clock rate | Computer to Peripheral LVDS Data 3 + |
| 12 | PD3 - | | | Computer to Peripheral LVDS Data 3 - |
| 13 | PCK RTN | | | GND |
| 14 | PCK + | Clock | Clock rate | Computer to Peripheral LVDS Clock + |
| 15 | PCK - | | | Computer to Peripheral LVDS Clock - |
| 16 | PCN RTN | | | GND |
| 17 | PCN + | Synch. To PCK | 10 x clock rate | Computer to Peripheral LVDS Control + |
| 18 | PCN - | | | Computer to Peripheral LVDS Control - |
| 19 | PDR0 RTN | | | GND |
| 20 | PDR0 + | Synch. To PCKR | 10 x clock rate | Peripheral to Computer LVDS Data 0 + |
| 21 | PDR0 - | | | Peripheral to Computer LVDS Data 0 - |
| 22 | PDR1 RTN | | | GND |
| 23 | PDR1 + | Synch. To PCKR | 10 x clock rate | Peripheral to Computer LVDS Data 1 + |
| 24 | PDR1 - | | | Peripheral to Computer LVDS Data 1 - |
| 25 | PDR2 RTN | | | GND |
| 26 | PDR2 + | Synch. To PCKR | 10 x clock rate | Peripheral to Computer LVDS Data 2 + |
| 27 | PDR2 - | | | Peripheral to Computer LVDS Data 2 - |
| 28 | PDR3 RTN | | | GND |
| 29 | PDR3 + | Synch. To PCKR | 10 x clock rate | Peripheral to Computer LVDS Data 3 + |
| 30 | PDR3 - | | | Peripheral to Computer LVDS Data 3 - |
| 31 | PCKR RTN | | | GND |
| 32 | PCKR + | Reverse Dir. Clock | Clock rate | Peripheral to Computer LVDS Clock + |
| 33 | PCKR - | | | Peripheral to Computer LVDS Clock - |
| 34 | PCNR RTN | | | GND |
| 35 | PCNR + | Synch. To PCKR | 10 x Clock rate | Peripheral to Computer LVDS Control + |
| 36 | PCNR - | | | Peripheral to Computer LVDS Control - |
| 37 | RESET# | | Asynchronous | Reset |

FIG. 23

| ID bits (P0 P1 P2 P3) | Data Packet Type |
|---|---|
| X X 0 0 | PCI 1st address/data segment |
| X X 1 0 | PCI 2nd address/data segment |
| 0 0 0 1 | Control 1st segment with PCI response |
| 1 0 0 1 | Control 1st segment without PCI response |
| 0 1 0 1 | Control 2nd segment with PCI response |
| 1 1 0 1 | Control 2nd segment without PCI response |
| 0 0 1 1 | Reserved |
| 1 0 1 1 | Reserved |
| 0 1 1 1 | Initialization |
| 1 1 1 1 | NOOP |

FIG. 24

DATA SECURITY METHOD AND DEVICE FOR COMPUTER MODULES

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,643,777. The reissue applications are U.S. application Ser. No. 11/056,604 (a parent reissue application), Ser. No. 11/545,056 (which is a reissue continuation of the parent reissue application), Ser. No. 12/561,138 (which is a reissue continuation of the parent reissue application), Ser. No. 13/294,108 (which is a reissue continuation of U.S. application Ser. No. 12/561,138), and Ser. No. 13/562,210 (the present application, which is a reissue continuation of U.S. application Ser. No. 13/294,108).*

*This application is a reissue continuation of U.S. application Ser. No. 13/294,108, which is a reissue continuation of U.S. application Ser. No. 12/561,138, which is a reissue continuation of U.S. application Ser. No. 11/056,604, which is a reissue of U.S. Pat. No. 6,643,777, which are incorporated herein by reference.*

BACKGROUND OF THE INVENTION

The present invention relates to computing devices. More particularly, the present invention provides a method and device for securing a personal computer or set-top box. Merely by way of example, the present invention is applied to a modular computing environment for desk top computers, but it will be recognized that the invention has a much wider range of applicability. It can be applied to other portable or modular computing applications.

Many desktop or personal computers, which are commonly termed PCs, have been around and used for over ten years. The PCs often come with state-of-art microprocessors such as the Intel Pentium™ microprocessor chips. They also include a hard or fixed disk drive including memory in the giga-byte range. Additionally, the PCs often include a random access memory integrated circuit device such as a dynamic random access memory device, which is commonly termed DRAM. The DRAM devices now provide up to millions of memory cells (i.e., mega-bit) on a single slice of silicon. PCs also include a high resolution display such as cathode ray tubes or CRTs. In most cases, the CRTs are at least 15 inches or 17 inches or 19 inches in diameter. High resolution flat panel displays are also used with PCs.

Many external or peripheral devices can be used with the PCs. Among others, these peripheral devices include mass storage devices such as a Zip™ Drive product sold by Iomega Corporation of Utah. Other storage devices include external hard drives, tape drives, and others. Additional devices include communication devices such as a modem, which can be used to link the PC to a wide area network of computers such as the Internet. Furthermore, the PC can include output devices such as a printer and other output means. Moreover, the PC can include special audio output devices such as speakers the like.

PCs also have easy to use keyboards, mouse input devices, and the like. The keyboard is generally configured similar to a typewriter format. The keyboard also has the length and width for easily inputting information by way of keys to the computer. The mouse also has a sufficient size and shape to easily move a cursor on the display from one location to another location.

Other types of computing devices include portable computing devices such as "laptop" computers and the like. Although somewhat successful, laptop computers have many limitations. These computing devices have expensive display technology. In fact, these devices often have a smaller flat panel display that has poor viewing characteristics. Additionally, these devices also have poor input devices such as smaller keyboards and the like. Furthermore, these devices have limited common platforms to transfer information to and from these devices and other devices such as PCs.

Up to now, there has been little common ground between these platforms including the PCs and laptops in terms of upgrading, ease-of-use, cost, performance, and the like. Many differences between these platforms, probably somewhat intentional, has benefited computer manufacturers at the cost of consumers. A drawback to having two separate computers is that the user must often purchase both the desktop and laptop to have "total" computing power, where the desktop serves as a "regular" computer and the laptop serves as a "portable" computer. Purchasing both computers is often costly and runs "thousands" of dollars. The user also wastes a significant amount of time transferring software and data between the two types of computers. For example, the user must often couple the portable computer to a local area network (i.e., LAN), to a serial port with a modem and then manually transfer over files and data between the desktop and the portable computer. Alternatively, the user often must use floppy disks to "zip" up files and programs that exceed the storage capacity of conventional floppy disks, and transfer the floppy disk data manually.

Another drawback with the current model of separate portable and desktop computer is that the user has to spend money to buy components and peripherals the are duplicated in at least one of these computers. For example, both the desktop and portable computers typically include hard disk drives, floppy drives, CD-ROMs, computer memory, host processors, graphics accelerators, and the like. Because program software and supporting programs generally must be installed upon both hard drives in order for the user to operate programs on the road and in the office, hard disk space is often wasted.

One approach to reduce some of these drawbacks has been the use of a docking station with a portable computer. Here, the user has the portable computer for "on the road" use and a docking station that houses the portable computer for office use. The docking station typically includes a separate monitor, keyboard, mouse, and the like and is generally incompatible with other desktop PCs. The docking station is also generally not compatible with portable computers of other vendors. Another drawback to this approach is that the portable computer typically has lower performance and functionality than a conventional desktop PC. For example, the processor of the portable is typically much slower than processors in dedicated desktop computers, because of power consumption and heat dissipation concerns. As an example, it is noted that at the time of drafting of the present application, some top-of-the-line desktops include 400 MHz processors, whereas top-of-the-line notebook computers include 266 MHz processors.

Another drawback to the docking station approach is that the typical cost of portable computers with docking stations can approach the cost of having a separate portable computer and a separate desktop computer. Further, as noted above, because different vendors of portable computers have proprietary docking stations, computer users are held captive by their investments and must rely upon the particular computer vendor for future upgrades, support, and the like.

To date, most personal computers provide data file security through software only. A wide variety of removable storage media are available for a personal computer. These removable media do not provide any access security protection in hardware. Data encryption program often must be used for protection. Such program is cumbersome to handle for the user requiring extra cost and time. Data encryption is more commonly used for communication over an unprotected network or the Internet. Having a large number of frequently used files managed by encryption software is not practical. Without software security program, any file can be read and copied illegally from a hard disk drive on a PC or any removable media.

PC architecture generally allows freedom of data flow between memory and peripheral devices within the allowed memory and I/O address spaces. In conventional PC architecture, a peripheral bus, i.e. PCI bus, is used to control all data transactions among peripheral devices. PCI bus allows any device to be a bus master and perform data transaction with another device. Also when a software program is in control, it can move data between any two devices. There is no hardware or protocol security mechanism on a standard peripheral bus such as PCI Bus to detect or block data transactions. Operating system may have individual files read or write protected. These types of special security feature require significant additional user interaction to control. This is too cumbersome for a typical user to manage. There is no mechanism in current PCs to allow access to the primary hard disk drive and yet prevent copying of its content. The conventional PC is a single machine that does not have a mechanism to perform security ID matching in hardware.

Thus, what is needed are computer systems that provide improved security features to prevent illegal or unauthorized access to information.

SUMMARY OF THE INVENTION

According to the present invention, a technique including a method and device for securing a computer module in a computer system is provided. In an exemplary embodiment, the present invention provides a security system for an attached computer module ("ACM"). In an embodiment, the ACM inserts into a computer module bay (CMB) within a peripheral console to form a functional computer. A security program reads an identification number in a security memory device to determine a security level of the ACM according to one embodiment.

In a specific embodiment, the present invention provides a system for secured information transactions. The system has a console (e.g., computer housing) comprising a peripheral controller housed in the console; and a security memory device (e.g., flash memory device) coupled to the peripheral controller. The system also has an attached computer module (i.e., a removable module with memory and microprocessor) coupled to the console. The attached computer module has a host interface controller housed within the attached computer module to interface to the security memory device through the peripheral controller.

In an alternative embodiment, the present invention provides a security protection method for a computer module. The method includes steps or acts of inserting the computer module into a console. Once the module has been inserted, the method initiates a security program in the module to read a security identification of the console and to read a security identification of the computer module. Based upon a relationship of the console identification and the computer module identification, a predetermined security status is determined from, for example, a look up table or the like. The method then selects the predetermined security status, which can be one of many. The method then operates the computer module based upon the security status.

In a further alternative embodiment, the present invention provides a method for identifying a user for a computer module. The method includes inserting a computer module into a console; and initiating a security program in memory of the computer module. The method prompts a plurality of input fields corresponding to respective input information on a user interface to be provided by a user of the computer module. Next, the method inputs the input information into the user interface of the computer module. The input information includes a user (e.g., owner) name, a user (e.g., owner) password, a business name, a business password, and a location.

Still further, the present invention provides a system for secured information transactions, e.g., data security, electronic commerce, private communications. The system includes a console comprising a peripheral controller housed in the console. A user identification input device (e.g., keyboard, retinal reader, finger print reader, voice recognition unit) is coupled to the peripheral controller. The user identification input device is provided for user identification data of the user. The system has an attached computer module coupled to the console. The attached computer module has a security memory device (e.g., flash memory device) stored with the user identification data.

Numerous benefits are achieved using the present invention over previously existing techniques. The present invention provides mechanical and electrical security systems to prevent theft or unauthorized use of the computer system in a specific embodiment. Additionally, the present invention substantially prevents accidental removal of the ACM from the console. In some embodiments, the present invention prevents illegal or unauthorized use during transit. The present invention is also implemented using conventional technologies that can be provided in the present computer system in an easy and efficient manner. Depending upon the embodiment, one or more of these benefits can be available. These and other advantages or benefits are described throughout the present specification and are described more particularly below.

These and other embodiments of the present invention, as well as its advantages and features, are described in more detail in conjunction with the text below and attached FIGS.

BRIEF DESCRIPTION OF THE DRAWINGS

*FIGS. 21 and 22 are tables including the pin number, symbol, signal, standard and description for the pins on the peripheral and video connectors, respectively.*

*FIG. 23 is a table showing the symbols, signals, data rate and description of signals in a first embodiment of the XPBus.*

*FIG. 24 is a table showing different types of first nibbles and their corresponding data packet types.*

DESCRIPTION OF THE SPECIFIC EMBODIMENTS

Figure 1:
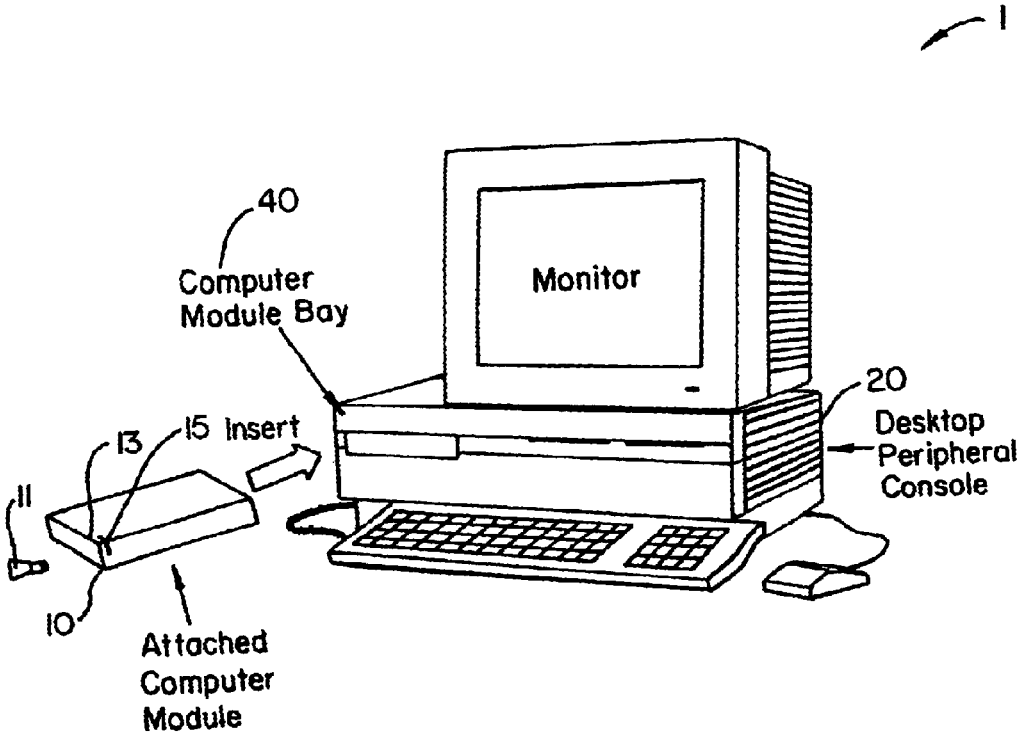
FIG. 1 is a simplified diagram of a computer system according to an embodiment of the present invention.

FIG. 1 is a simplified diagram of a computer system 1 according to an embodiment of the present invention. This diagram is merely an illustration and should not limit the scope of the claims herein. One of ordinary skill in the art would recognize other variations, modifications, and alternatives. The computer system 1 includes an attached computer module (i.e., ACM) 10, a desktop console 20, among other elements. The computer system is modular and has a variety of components that are removable. Some of these components (or modules) can be used in different computers, workstations, computerized television sets, and portable or laptop units.

In the present embodiment, ACM 10 includes computer components, as will be described below, including a central processing unit ("CPU"), IDE controller, hard disk drive, computer memory, and the like. The computer module bay (i.e., CMB) 40 is an opening or slot in the desktop console. The CMB houses the ACM and provides communication to and from the ACM. The CMB also provides mechanical protection and support to ACM 10. The CMB has a mechanical alignment mechanism for mating a portion of the ACM to the console. The CMB further has thermal heat dissipation sinks, electrical connection mechanisms, and the like. Some details of the ACM can be found in co-pending U.S. patent application Ser. Nos. 09/149,882 and 09/149,548 filed Sep. 8, 1998 commonly assigned, and hereby incorporated by reference for all purposes.

In a preferred embodiment, the present system has a security system, which includes a mechanical locking system, an electrical locking system, and others. The mechanical locking system includes at least a key 11. The key 11 mates with key hole 13 in a lock, which provides a mechanical latch 15 in a closed position. The mechanical latch, in the closed position, mates and interlocks the ACM to the computer module bay. The mechanical latch, which also has an open position, allows the ACM to be removed from the computer module bay. Further details of the mechanical locking system are shown in the FIG. below.

Figure 2:
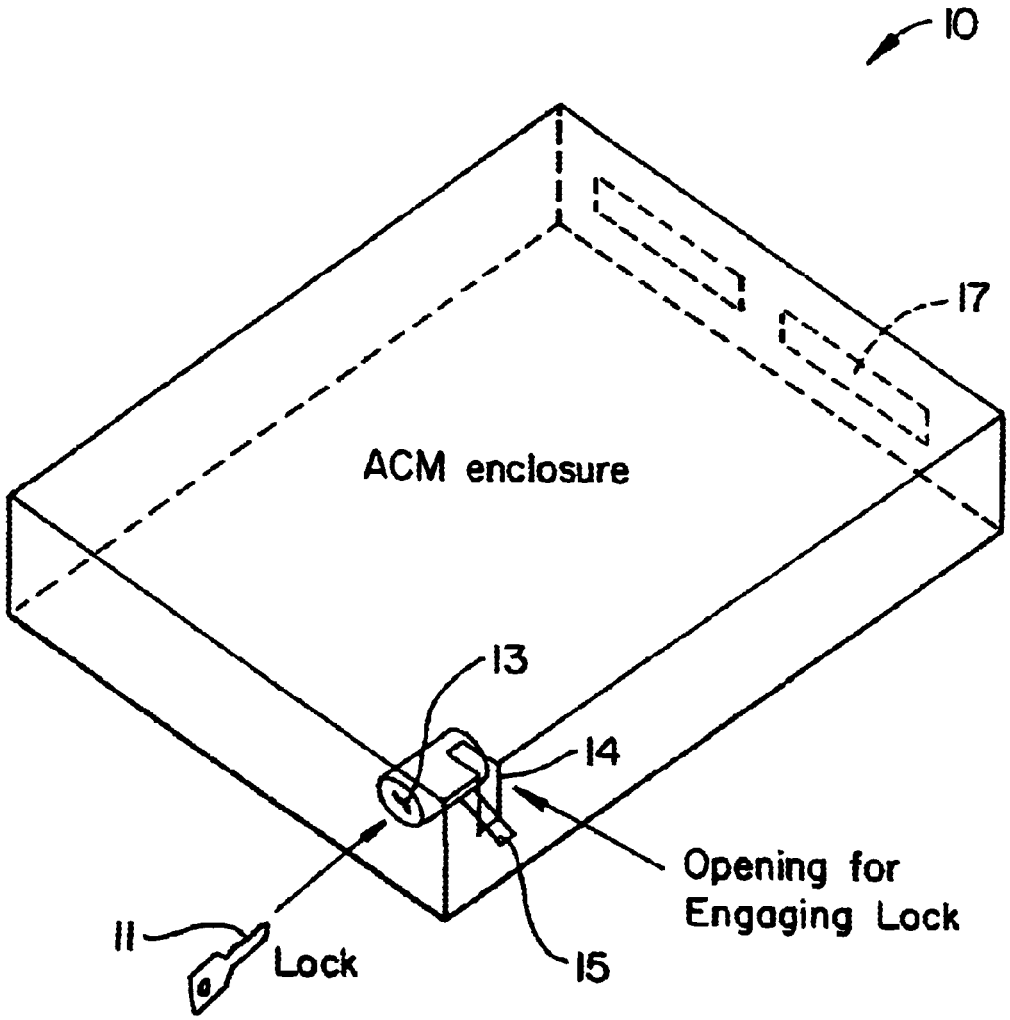
FIG. 2 is a simplified diagram of a computer module according to an embodiment of the present invention.

FIG. 2 is a simplified diagram of a computer module 10 according to an embodiment of the present invention. This diagram is merely an illustration and should not limit the scope of the claims herein. One of ordinary skill in the art would recognize other variations, modifications, and alternatives. Some of the reference numerals are similar to the previous FIG. for easy reading. The computer module 10 includes key 11, which is insertable into keyhole 13 of the lock. The lock has at least two position, including a latched or closed position and an unlatched or open position. The latched position secures the ACM to the computer module bay. The unlatched or open position allows the ACM to be inserted into or removed from the computer bay module. As shown, the ACM also has a slot or opening 14, which allows the latch to move into and out of the ACM. The ACM also has openings 17 in the backside for an electrical and/or mechanical connection to the computer module bay, which is connected to the console.

Figure 3:
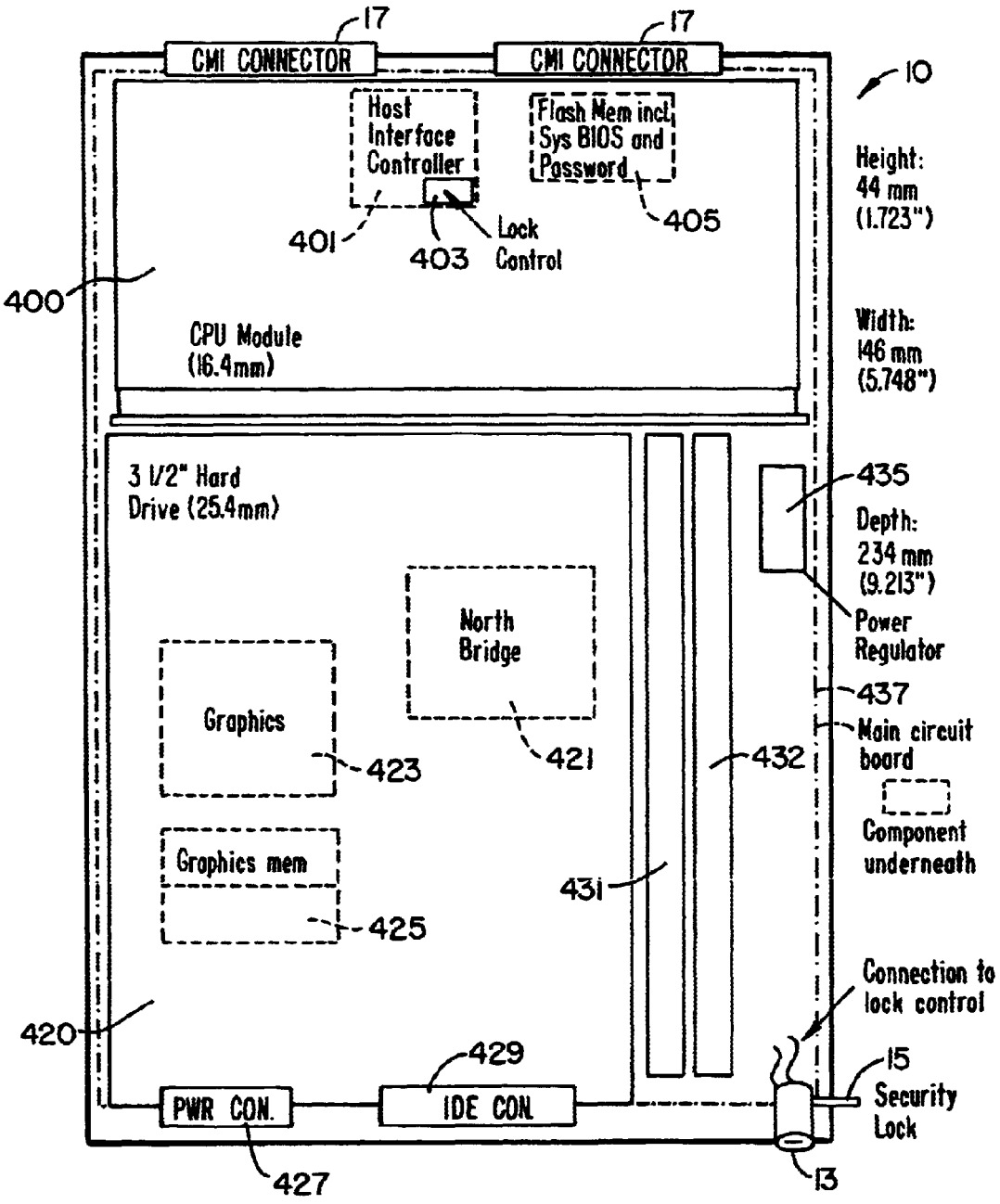
FIG. 3 is a simplified top-view diagram of a computer module according to an embodiment of the present invention.

FIG. 3 is a simplified top-view diagram 10 of a computer module for computer system according to an embodiment of the present invention. This diagram is merely an illustration and should not limit the scope of the claims herein. One of ordinary skill in the art would recognize other variations, modifications, and alternatives. The layout diagram illustrates the top-view of the module 10, where the backside components (e.g., Host Interface Controller) are depicted in dashed lines. The layout diagram has a first portion, which includes a central processing unit ("CPU") module 400, and a second portion, which includes a hard drive module 420. A common printed circuit board 437 houses these modules and the like. Among other features, the ACM includes the central processing unit module 400 with a cache memory 405, which is coupled to a north bridge unit 421, and a host interface controller 401. The host interface controller includes a lock control 403. As shown, the CPU module is disposed on a first portion of the attached computer module, and couples to connectors 17. Here, the CPU module is spatially located near connector 17.

The CPU module can use a suitable microprocessing unit, microcontroller, digital signal processor, and the like. In a specific embodiment, the CPU module uses, for example, a 400 MHz Pentium II microprocessor module from Intel Corporation and like microprocessors from AMD Corporation, Cyrix Corporation (now National Semiconductor Corporation), and others. In other aspects, the microprocessor can be one such as the Compaq Computer Corporation Alpha Chip, Apple Computer Corporation PowerPC G3 processor, and the like. Further, higher speed processors are contemplated in other embodiments as technology increases in the future.

In the CPU module, host interface controller 401 is coupled to BIOS/flash memory 405. Additionally, the host interface controller is coupled to a clock control logic, a configuration signal, and a peripheral bus. The present invention has a host interface controller that has lock control 403 to provide security features to the present ACM. Furthermore, the present invention uses a flash memory that includes codes to provide password protection or other electronic security methods.

The second portion of the attached computer module has the hard drive module 420. Among other elements, the hard drive module includes north bridge 421, graphics accelerator 423, graphics memory 425, a power controller 427, an IDE controller 429, and other components. Adjacent to and in parallel alignment with the hard drive module is a personal computer interface ("PCI") bus 431, 432. A power regulator 435 is disposed near the PCI bus.

In a specific embodiment, north bridge unit 421 often couples to a computer memory, to the graphics accelerator 423, to the IDE controller, and to the host interface controller via the PCI bus. Graphics accelerator 423 typically couples to a graphics memory 423, and other elements. IDE controller 429 generally supports and provides timing signals necessary for the IDE bus. In the present embodiment, the IDE controller is embodied as a 643U2 PCI-to IDE chip from CMD Technology, for example. Other types of buses than IDE are contemplated, for example EIDE, SCSI, USB, and the like in alternative embodiments of the present invention.

The hard drive module or mass storage unit 420 typically includes a computer operating system, application software program files, data files, and the like. In a specific embodiment, the computer operating system may be the Windows98 operating system from Microsoft Corporation of Redmond Washington. Other operating systems, such as WindowsNT, MacOS8, Unix, and the like are also contemplated in alternative embodiments of the present invention. Further, some typical application software programs can include Office98 by Microsoft Corporation, Corel Perfect Suite by Corel, and others. Hard disk module 420 includes a hard disk drive. The hard disk drive, however, can also be replaced by removable hard disk drives, read/write CD ROMs, flash memory, floppy disk drives, and the like. A small form factor, for example 2.5", is currently contemplated, however, other form factors, such as PC card, and the like are also contemplated. Mass storage unit 240 may also support other interfaces than IDE.

In a specific embodiment, the present invention provides a file and data protection security system and method for a removable computer module or ACM. ACM contains the primary hard disk drive (HDD) where the operating system, application programs, and data files reside. The security system is used to prevent illegal access and copying of any file residing on the HDD inside ACM. An ACM is a self-contained computing device that can be armed with security software and hardware to protect its owner's private files and data. ACM docks with a computer bay in a wide variety of peripheral consoles. The combined ACM and peripheral console function as a personal computer. A computer module interface bus connects ACM and peripheral device. In some embodiments, all ACM data passes through computer module interface (CMI) bus to reach any device in the peripheral console, i.e. floppy drive, removable media, secondary hard disk drive, modem, and others. CMI bus data transfer is controlled by a pair of interface controllers on either side of the bus. This partitioning of a personal computer offer a way of protecting against illegal access of data residing within ACM by guarding data transaction through the computer module interface bus.

In a specific embodiment, a secured ACM has an enclosure that includes the following components:

1) ACPU,
2) Main memory,
3) A primary Hard Disk Drive (HDD),
4) Operating System, application software, data files on primary HDD,
5) Interface circuitry and connectors to peripheral console,
6) Flash memory used for storing security code and ID,
7) Data detection and control circuitry to manage data flow to peripheral console,
8) Circuit board connecting the above components, and others.

A peripheral console includes some of the following elements:

1) Input means, e.g. keyboard and mouse,
2) Display means, e.g. CRT monitor, or integrated LCD display,
3) Removable storage media subsystem, e.g. Floppy drive, CDROM drive,
4) Communication device, e.g. LAN or modem,
5) Computer Module Bay, interface device and connectors to ACM,
6) Flash memory with security ID,
7) Power supply or battery system, and other devices.

The Computer Module Bay (CMB) is an opening in a peripheral console that receives ACM. CMB provides mechanical protection and electrical connection to ACM. The Computer Module Interface bus is made up of 3 bus components: video bus, peripheral data bus, and power bus. Video Bus consists of video output of graphics devices, i.e. analog RGB and control signals for monitor, or digital video signals to drive flat panel displays. Power bus supplies the power for ACM. Peripheral data bus is a high speed, compressed, peripheral bridge bus managed by a Host Interface Controller in ACM and a peripheral Interface Controller in peripheral console. In some embodiments, all peripheral data transaction passes through the interface controllers.

The implementation of the secured ACM generally includes the following elements:

1) A programmable Flash memory controlled by the Peripheral Interface Controller containing the security ID for the peripheral console,
2) A programmable Flash memory controlled by the Host Interface Controller containing hardware specific security code and ID for the computer module,
3) A data detection and control circuitry within Host Interface Controller to detect and manage data going out of ACM, and
4) A low level hardware dependent security code to perform security ID matching, hardware programming to manage data flow,
5) A high-level security program to manage user interface, program security ID, program security level, and other functions.

The hardware and software implementation allow more flexibility in the level of security protection offered to an ACM owner. Some examples of security levels are:

1) No access—Security IDs do not match according to owner's requirement. The Host Interface Controller blocks all peripheral data traffic between ACM and peripheral console except for keyboard and mouse,
2) Peripheral Read-only—No files can be written to any peripheral devices. All peripheral devices in peripheral console are managed as Read-only devices. The primary hard disk drive in ACM can be accessed freely,
3) Limited access—Certain peripheral devices are allowed read/write access, i.e. modem, and other devices are Read-only, i.e. removable media devices,
4) Full access—No restriction, and others.

Upon power up, the low level security code is executed to compare security ID between the respective flash memory between ACM and peripheral console. Typical security ID can include:

1) User ID
2) User password
3) User Access privilege
4) Business ID

5) Business password

6) Equipment ID

7) Equipment access privilege, and any other security IDs.

The user through the security program can activate different levels of password protection, which can be stored in a look up table. The company through the security program can control different levels of access privilege of a user, a business group, or equipment. The security code then program the security level allowed by the access privilege determined by the security ID matching result. For example, if an unidentified peripheral console is detected upon power up by the low level security code, e.g. a home unit, the access privilege can set to Peripheral Read-only. With Read-only access privilege for all peripheral devices in peripheral console, the data detection and control circuitry is programmed to monitor all data traffic going to the peripheral console. Any memory block transfer to peripheral console will be detected and blocked. Under this mode, a user can use the computer with free access to the primary HDD in ACM. Any files can be read from other storage media in the peripheral console. But no files from the primary HDD can be copied to another media.

The data detection circuitry separately monitors peripheral bus operation type and memory address range being accessed. A specific address range for memory accesses and for I/O accesses can be programmed for the data detection circuitry to flag a match. A data blocking circuitry is triggered by the detection circuitry when a match occurs, and blank out the data that is being sent to the peripheral console. For the security system to be effective, a [temper] *tamper* resistant enclosure must be used to prevent removal of the hard disk drive and the flash memory inside ACM. Further details are shown throughout the present specification and more particularly below.

Figure 4:
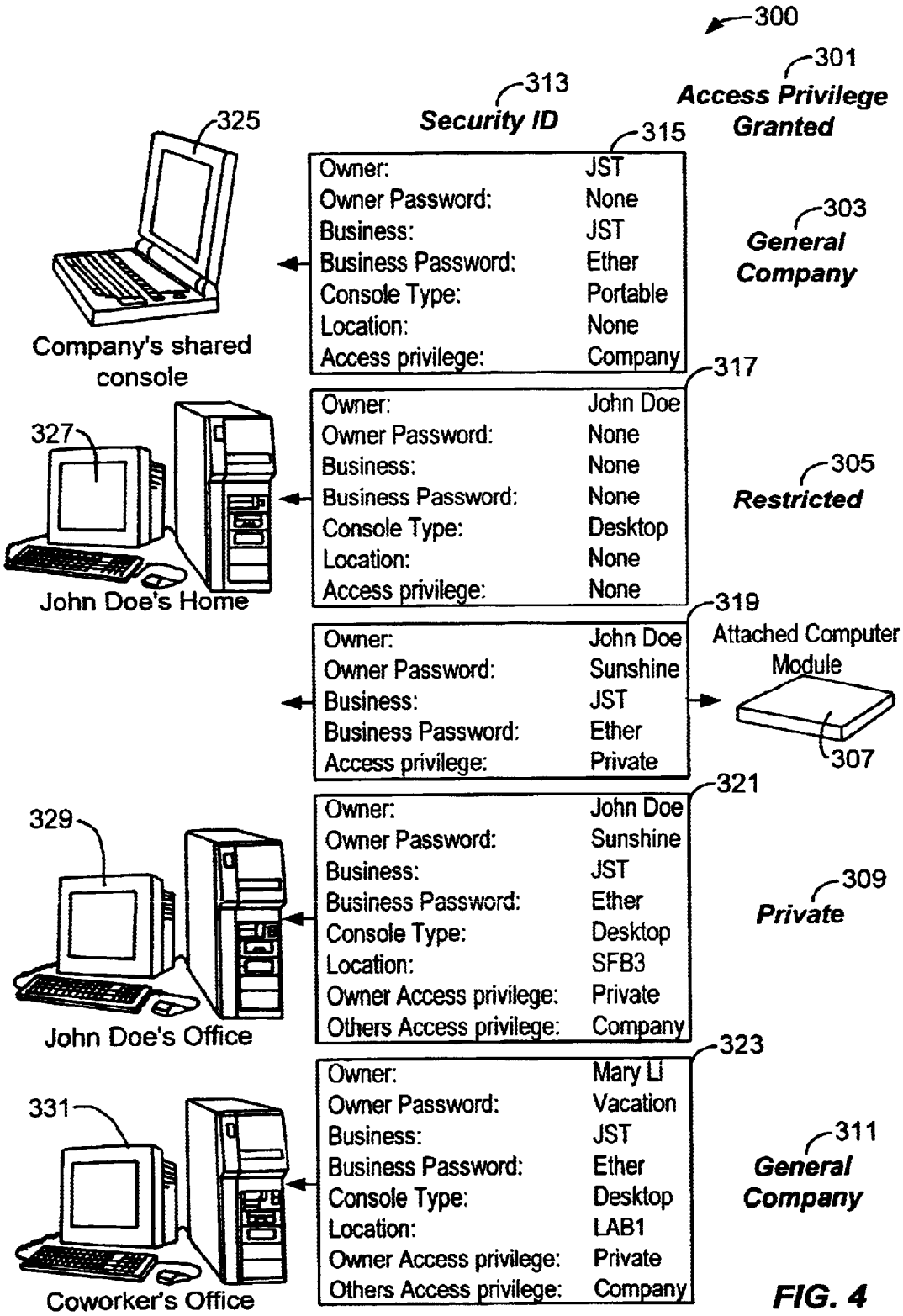
FIG. 4 is a simplified illustration of security systems according to embodiments of the present invention.

FIG. 4 is a simplified illustration of security systems 300 according to embodiments of the present invention. This illustration is merely an example, which should not limit the scope of the claims herein. One of ordinary skill in the art would recognize other variations, modifications, and alternatives. The systems show various examples of ways to implement the present invention. Here, a user relies upon certain consoles to access information. A company's shared portable console 325 can access general company information 303. Selected security identification information 315 is entered into the shared console to access the information via a network. The information generally includes owner, owner password, business, business password, console type, location, and access privilege information, which is displayed on a user display. The owner is generally the user name. Owner password is the user password. The business is the business unit name and business password is the business unit password. The console type can be portable for laptops, notebooks, and the like. Alternatively, the console type can be a desktop. The location generally specifies the desktop location or address for a networked system. Alternatively, the location can also be a home location. Access privilege can be categorized into many different levels. For example, the user can access general company information, but not information directed to other business units. The user can also be limited to access his/her private information, which is company related. Many other types of information can be restricted or accessed depending upon the embodiment.

Other types of access can be granted depending upon the consoles. For example, various consoles include, among others, a console at a user's home, e.g., "John Doe's," a console in the user's office 329, a console in a co-worker's office 331, which the user can access. The access from John Doe's home console uses security identification 317 and provides restricted access 305. The user's use of the module 307 can be from a variety of consoles and is accessed using security identification 319. Here, access privilege is private, which allows the user to access private personal information or private company information that the user has created. The user's access from his office relies upon security identification 321, which grants access to private information and general company information. The co-worker's console can also be used with security identification 323, which allows the user to access general company information but not private information of John Doe, for example. Depending upon the console used by the user, the security system can provide partial or full access to information on servers via network as well as an attached computer module. Information can also be limited to read only for certain information sources such as a server, a hard drive, a floppy drive, and others.

In a specific embodiment, the present invention also provides a security feature for the ACM 307. Here, the user of the ACM can be granted access to information in the ACM if the correct security identification information 319 is provided to the combination of ACM and console. Once the correct information is provided, the user can access the information on the hard drive of the ACM, which can be for private use. Other levels of access and security can also be provided depending upon the application.

Figure 5:
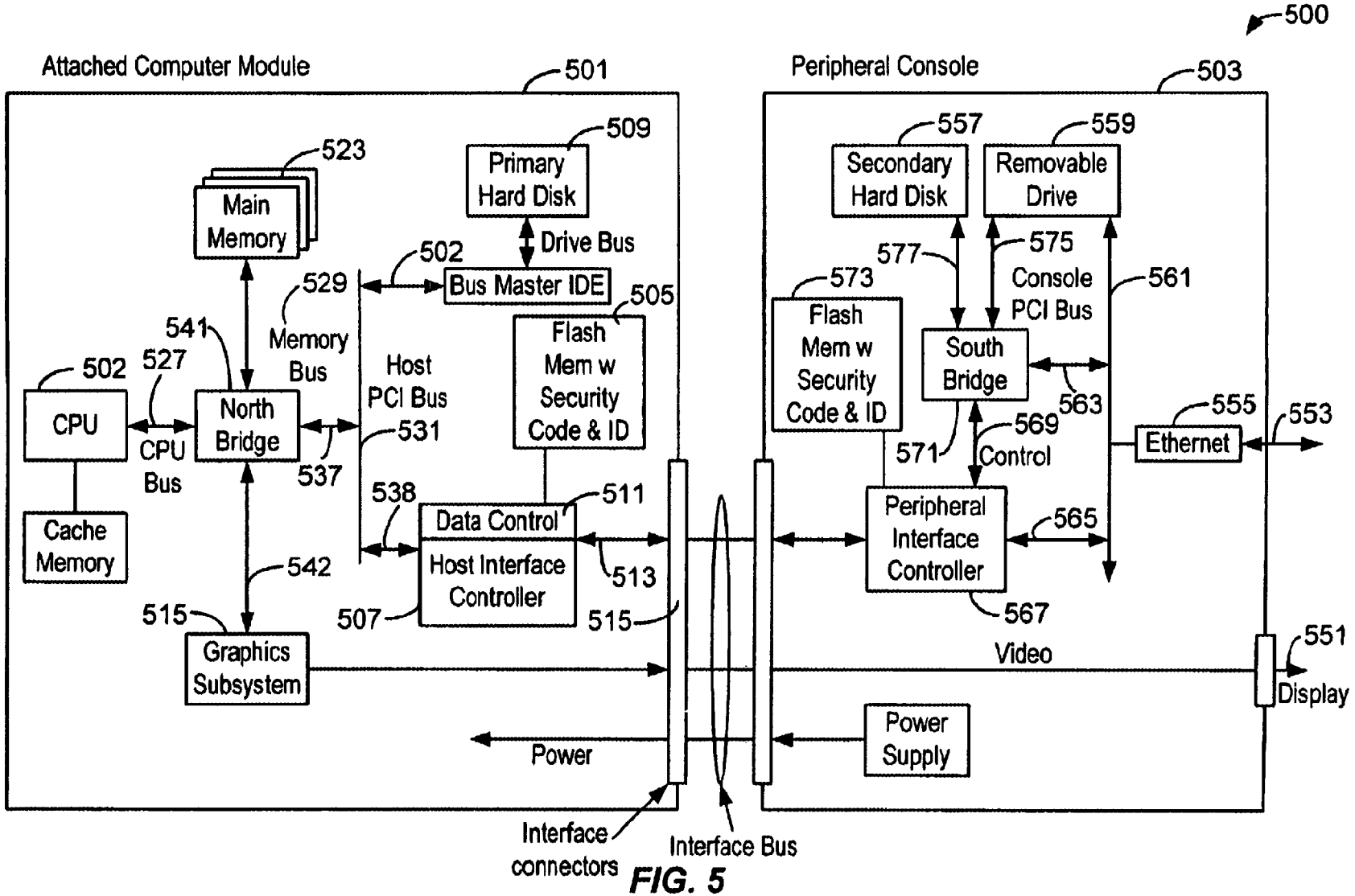
FIG. 5 is a simplified diagram of a computer module in a console according to an embodiment of the present invention.

FIG. 5 is a simplified diagram 500 of a computer module in a console according to an embodiment of the present invention. This diagram is merely an illustration which should not limit the scope of the claims herein. One of ordinary skill in the art would recognize other variations, modifications, and alternatives. The block diagram 500 includes an attached computer module 501 and a peripheral console 503, as well as other elements as desired. These elements have a variety of features such as those noted above, as well as others. In the present diagram, different reference numerals are used to show the operation of the present system.

The block diagram 500 illustrates attached computer module 501. The module 501 has a central processing unit 502, which communicates to a north bridge 541, by way of a CPU bus 527. The north bridge couples to main memory 523 via memory bus 529. The main memory can be any suitable high speed memory device or devices such as dynamic random access memory ("DRAM") integrated circuits and others. The DRAM includes at least 32 Meg. or 64 Meg. and greater of memory, but can also be less depending upon the application. Alternatively, the main memory can be coupled directly with the CPU in some embodiments. The north bridge also couples to a graphics subsystem 515 via bus 542. The graphics subsystem can include a graphics accelerator, graphics memory, and other devices. Graphics subsystem transmits a video signal to an interface connector, which couples to a display, for example.

The attached computer module also includes a primary hard disk drive 509 that serves as a main memory unit for programs and the like. The hard disk can be any suitable drive that has at least 2 GB and greater. As merely an example, the hard disk is a Marathon 2250 (2.25 GB, 2½ inch drive) product made by Seagate Corporation of Scotts Valley, but can be others. The hard disk communicates to the north bridge by way of a hard disk drive controller and bus lines 502 and 531. The hard disk drive controller couples to the north bridge by way of the host PCI bus 531, which connects bus 537 to the north bridge. The hard disk includes computer codes that implement a security program according to the present invention. Details of the security program are provided below.

The attached computer module also has a flash memory device 505 with a BIOS. The flash memory device 505 also has codes for a user password that can be stored in the device.

The flash memory device generally permits the storage of such password without a substantial use of power, even when disconnected. As merely an example, the flash memory device has at least 512 kilobits or greater of memory, or 1 megabits or greater of memory. The flash memory device can store a security identification number or the like. The flash memory device is generally non-volatile and can preserve information even when the power is turned off, for example. The flash memory generally has at least 128 kilobits storage cells or more. The flash memory can be any product such as a W29C020 product made by a company called Winbond of Taiwan, but can also be others. The flash memory cell and user identification will be more fully described below in reference to the FIGS. A host interface controller 507 communications to the north bridge via bus 535 and host PCI bus. The host interface controller also has a data control 511. Host interface controller 507 communicates to the console using bus 513, which couples to connection 515.

Peripheral console 503 includes a variety of elements to interface to the module 501, display 551, and network 553. The console forms around south bridge 571, which couples to bus 563, which couples to bus 561. Bus 561 is in communication with network card 555, which is a local area network for Ethernet, for example. South bridge also couples through control 569 to peripheral interface controller 567, which also communicates to bus 561. Peripheral interface controller also couples to host interface controller through connection 515 and bus 513. The peripheral console has a primary removable drive 559 connected to south bridge through bus 575. South bridge also couples to secondary hard disk through bus 577.

In a specific embodiment, the peripheral console also has a serial EEPROM memory device 575, which is coupled to the peripheral interface controller. The memory device can store a security identification number or the like. The memory device is generally non-volatile and can preserve information even when the power is turned off, for example. The memory generally has at least 16 kilobits of storage cells or more. Preferably, the memory device is a 16 kilobit device or 64 megabit device or greater, depending upon the application. The memory can be any product such as a X24320 product made by a company called Xicor, but can also be others. The memory cell and user identification will be more fully described below in reference to the FIGS.

Figure 6:
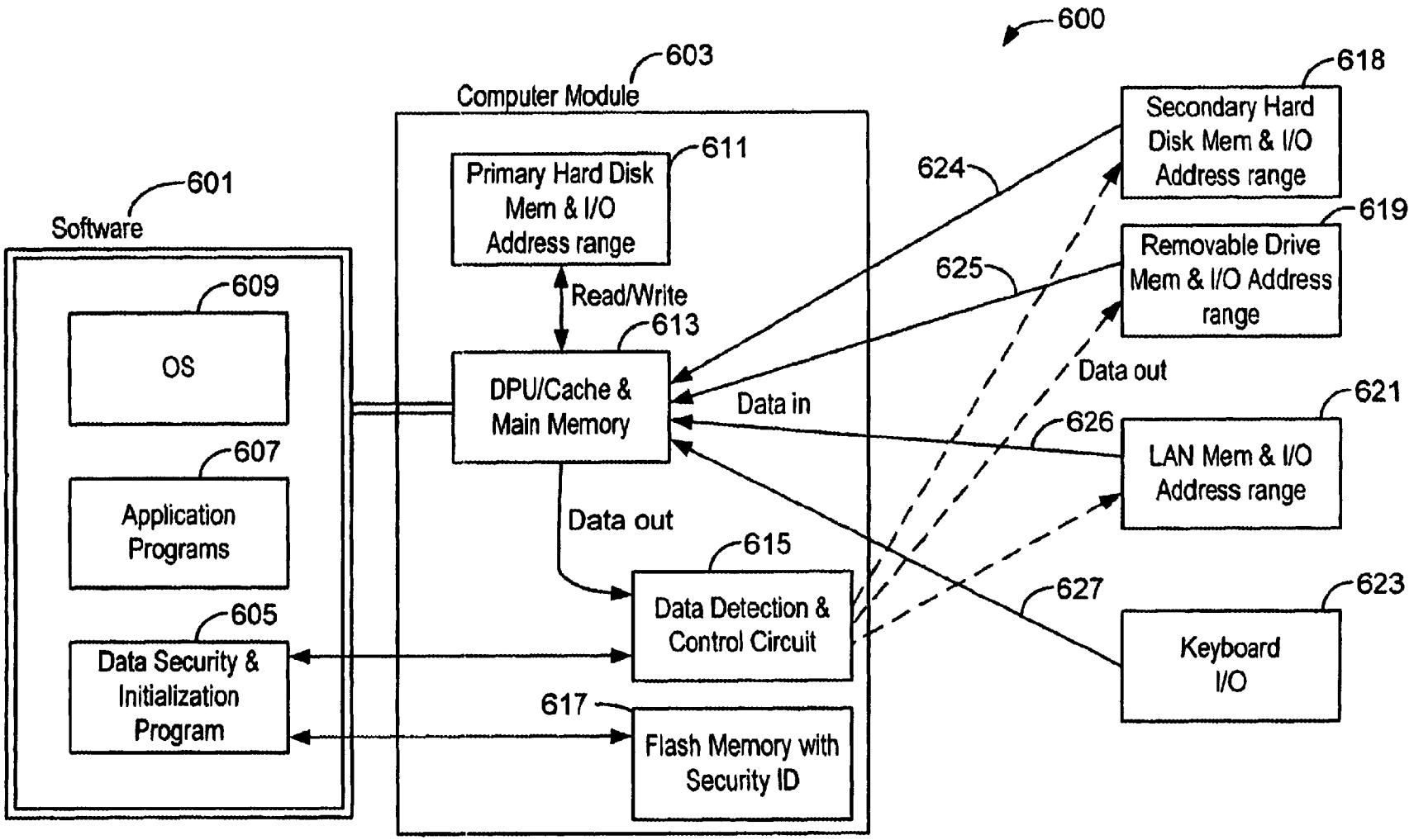
FIG. 6 is a simplified diagram of a security method for a module according to an embodiment of the present invention.

FIG. 6 is a simplified diagram of a security method 600 for a module according to an embodiment of the present invention. This diagram is merely an illustration which should not limit the scope of the claims herein. One of ordinary skill in the art would recognize other variations, modifications, and alternatives. The present method shows an example of how the present security method can be implemented. The present method uses a combination of software 601 and hardware 603, which is in the computer module. A plurality of external devices can be accessed depending upon the embodiment. These external devices include a secondary hard drive 618, a removable drive 619, a network (e.g., LAN, modem) device 621, and others. A keyboard 623 is also shown, which can act locally.

The software 601 includes an operating system 609, application programs 607, and a data security and initialization program 605. Other programs can also exist. Additionally, some of these programs may not exist. Preferably, the data security and initialization program exists. This data security and initialization program is initiated once the attached computer module is inserted into the console. The program interface and oversees a variety of hardware features, which will be used to control access to the external devices, for example. Of course, the particular configuration of the software will depend upon the application.

Hardware features can be implemented using a primary hard disk 611 coupled to a CPU/cache combination, which includes a main memory. The main memory is often a volatile memory such as dynamic random access memory. Data from any one of the external devices can enter the CPU/cache combination. For example, the secondary hard disk memory and I/O address range data is transferred 624 to the CPU/cache combination. The removable drive memory and I/O address range data can also transfer 625 to the CPU/cache combination. The LAN memory and 1/0 address range data can also transfer 626 to the CPU/cache combination. Keyboard data can also transfer 627 to the CPU/cache combination. To write data from the module into any one of these external elements, the data security program interfaces with the data detection and control circuit to determine of such data should be transferred to any one of the external elements. As noted, the external elements include, among others, secondary hard disk, and removable drive. Here, the data security program checks the security identification number with other numbers to determine the security access level. There are many other ways that the present invention can be implemented. These methods are described more fully below.

Figure 7:
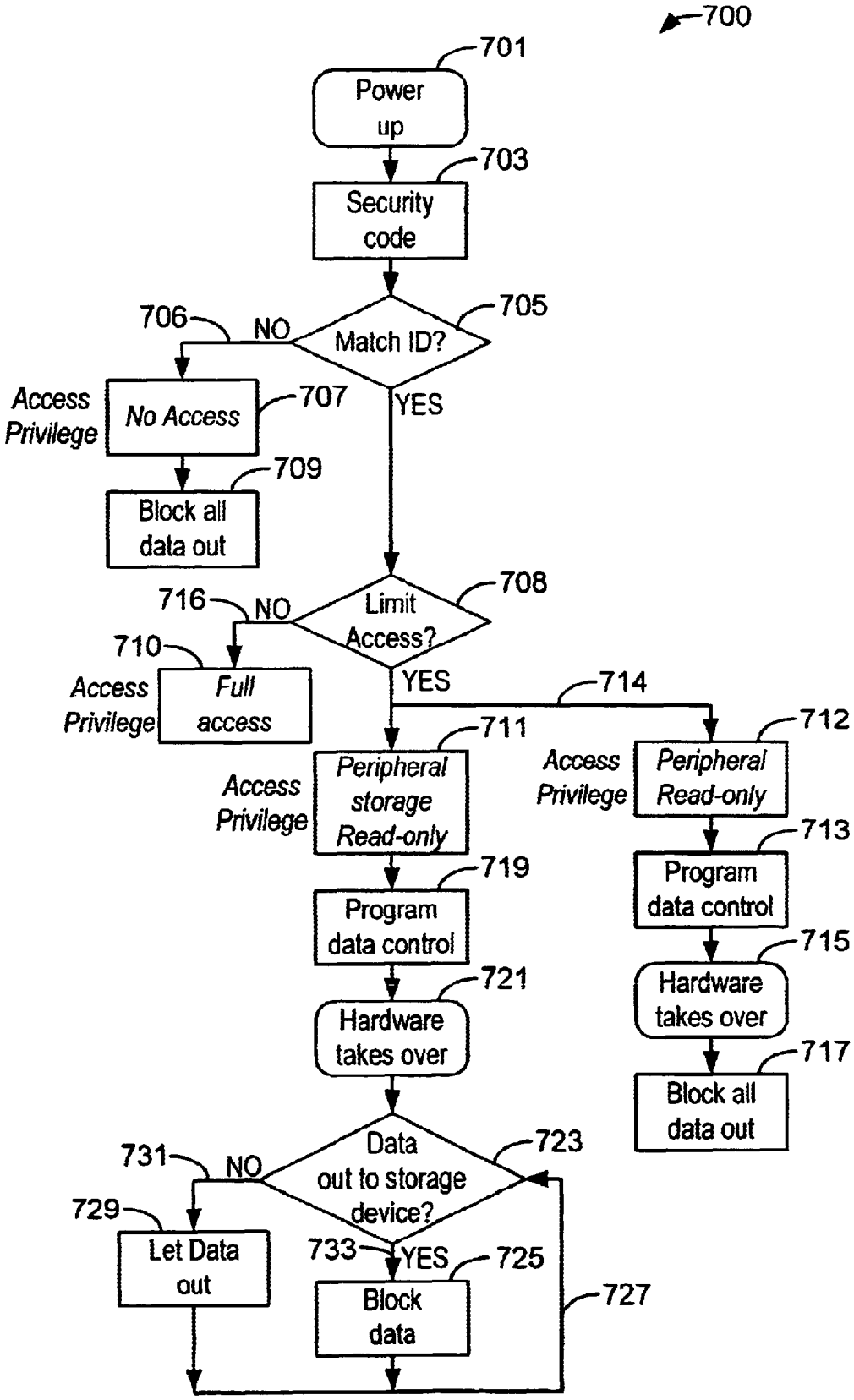
FIG. 7 is a simplified diagram of a method according to an embodiment of the present invention.

FIG. 7 is a simplified diagram 700 of a method according to an embodiment of the present invention. This diagram is merely an illustration which should not limit the scope of the claims herein. One of ordinary skill in the art would recognize other variations, modifications, and alternatives. The present method begins at power up, which is step 701. The present method reads a security code, which has been entered by a user, for example, in step 703. The security code can be a string of characters, including numbers and letters. The security code is preferably a mixture of numbers and letters, which are at least about 6 characters in length, but is not limited.

The present method reads (step 703) the security code, which has been entered. Next, the security code is compared with a stored code, which is in flash memory or the like (step 705). If the compared code matches with the stored code, the method resumes to step 708. Alternatively, the method goes to step 707 via branch 706 where no access is granted. When no access is granted, all data are blocked out from the user that attempts to log onto the system. Alternatively, the method determines if a certain level of access is granted, step 708. Depending upon the embodiment, the present method can grant full access, step 710, via branch 716. The present method allows full access based upon information stored in the flash memory device. Alternatively, the method can allow the user to access a limited amount of information.

Here, the present method allows for at least one or more than two levels of access. In a specific embodiment, the present method allows for the user of the module to access peripheral storage (step 711). The access privilege is read-only. The user can read information on the peripheral storage including hard disks and the like. Once the user accesses the storage, the method data control , step 719, takes over, where the hardware prevents the user from accessing other information, step 721. In a specific embodiment, the method can allow information to be removed from the peripheral storage. If the method allows for data to be removed, step 723, the method goes through branch 731 to let data out, which can occur through the module. Alternatively, the method goes to block data (step 725) via branch 733. Depending upon the embodiment, the method returns to the decision block, step 723. Alternatively, the method traverses branch 714 to a peripheral read-only process, step 712. The read-only process programs data control, step 713. Next, the hardware takes over (step 715). The method blocks all data from being accessed by the user, step 717.

Figure 8:
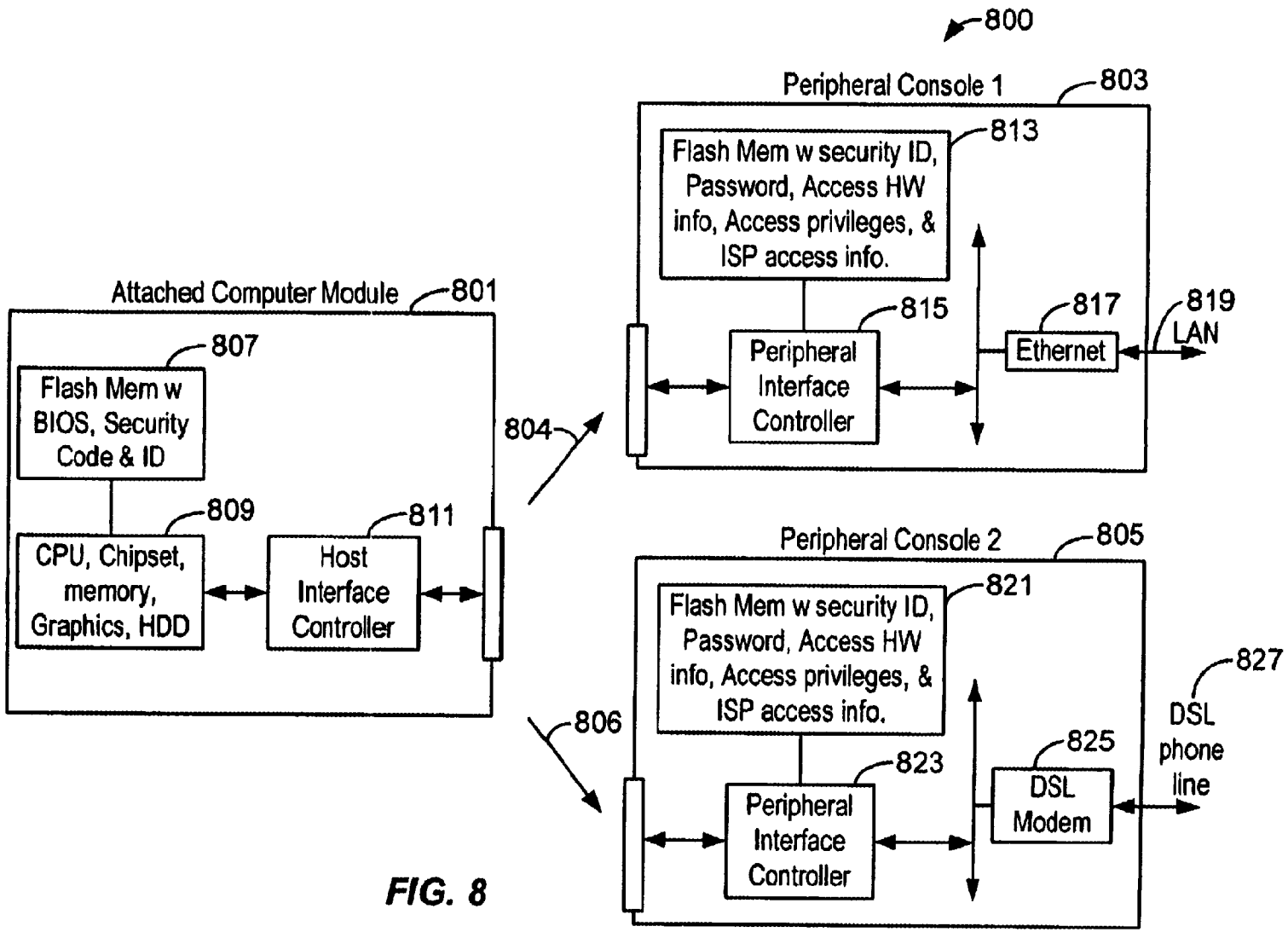
FIG. 8 is a simplified diagram of a system 800 according to an alternative embodiment of the present application.

FIG. 8 is a simplified diagram of a system 800 according to an alternative embodiment of the present invention. This diagram is merely an example which should not limit the scope of the claims herein. One of ordinary skill in the art would recognize many other variations, modifications, and alternatives. The system 800 includes an attached computer module 801, which can be inserted into one of a plurality of console devices to create a "plug and play" operation. For example, the console device can be peripheral console 801 or peripheral console 805. Each peripheral console can have similar or different connection characteristics. Peripheral console 803 couples to a local area network using Ethernet 817. Peripheral console 805 couples to a DSL line 827 through a DSL modem 825. Other consoles can also be included to use other types of networks such as ADSL, Cable Modem, wireless, Token Ring, and the like.

As shown, the attached computer module has elements such as a memory region 807, which stores BIOS information, a security code, and a security identification number on a flash memory device or the like. The memory region couples to a central processing region 809, which can include CPU, chipset, cache memory, graphics, and a hard disk drive, as well as other features. The central processing region couples to a host interface controller, which interfaces the attached computer module to one of the peripheral consoles. Any of the above information can also be included in the attached computer module.

Each peripheral console also has a variety of elements. These elements include a region 813, 821, which has a flash memory device with a security identification number, a password, access information, access privileges, internet service provider access information, as well as other features, which were previously noted. The peripheral console also has an interface controller 815, 823, which couples region 813, 821, respectively to a networking device 817, 825. The networking device can be an Ethernet card 817, which allows communication to the local area network 819. Alternatively, the networking device can be a DSL modem 825, which allows communication to a DSL (or ADSL) phone line. Other types of networking device can also be used, depending upon the application.

Each console provides a selected connection based upon set of predefined factors. These factors include communication hardware information so that software in attached computer module can read and allow a connection to a network. Here, access information can be provided to the user. Information about connection information will also be included. This connection information includes telephone numbers, account numbers, passwords (local), or a company password. The console and module combination will take care of charges, etc. based upon time bases. Module will have credit card information, but will have security. In a specific embodiment, the module inserts into the console. The module then asks the console which hardware will be used. If the hardware is an Ethernet connect, the module configures connection information to access the Ethernet connection. Alternatively, if the hardware requires a DSL connection, the module configures connection information to access the DSL connection. Other configuration information such as company server information, password, can also be provided.

*A personal computer system that comprises two physically separate units and the interconnection between them is disclosed. The first unit, an attached computing module (ACM), contains the core computing power and environment for a computer user. The second unit, a peripheral console (PCON), contains the power supply and primary input and output devices for the computer system. An ACM and a PCON are coupled with one another to form a fully functional personal computer system.*

Figure 9:
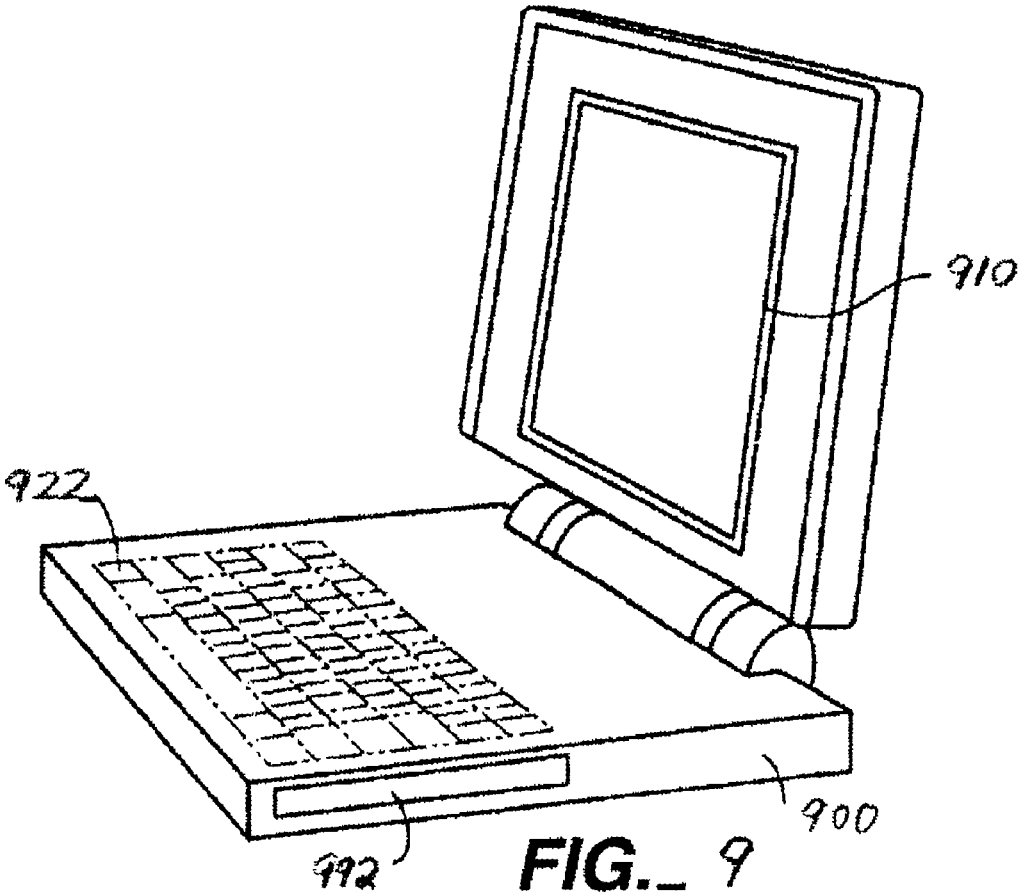
*FIG. 9 depicts a peripheral console configuration.*

*FIG. 9 depicts a notebook computer PCON configuration. The opening of the computer bay 992 is visible at the side of the PCON unit 900. The PCON 900 provides an integrated LCD display panel 910 as the user's primary display device. The PCON 900 provides an integrated keyboard 922 as the user's primary input device.*

Figure 10:
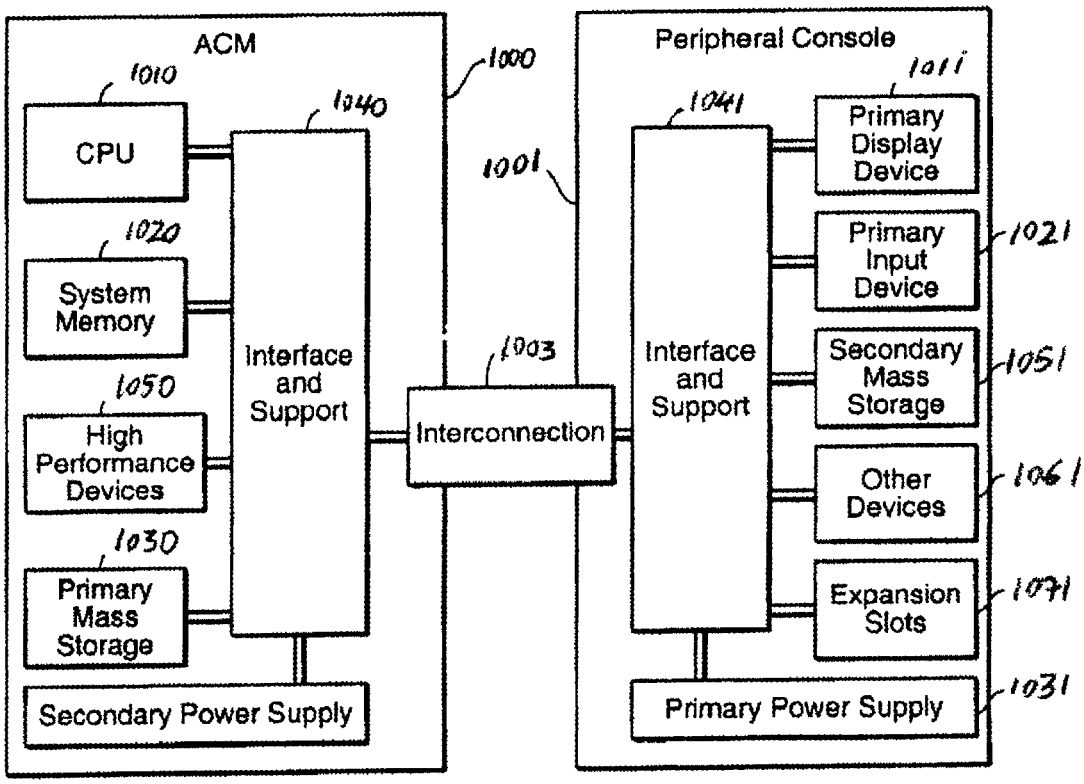
*FIG. 10 is a block diagram of one embodiment of a computer system employing the present invention.*

*FIG. 10 is a block diagram of the components in one computer system. The computer system comprises an attached computer module (ACM) 1000, a peripheral console (PCON) 1001, and the interconnection apparatus 1003 between them. The ACM 1000 includes the central processing unit (CPU) 1010, system memory 1020, high performance devices 1050, primary mass storage 1030, and related interface and support circuitry 1040. The PCON 1001 includes primary display 1011, primary input 1021, secondary mass storage 1051, other devices 1061, expansion slots 1071, the primary power supply 1031, and related interface and support circuitry 1041. The interconnection apparatus 1003 includes circuitry to convey power and operational signals between the ACM 1000 and PCON 1001.*

*Within the ACM 1000, the CPU 1010 executes instructions and manipulates data stored in the system memory 1020. The CPU 1010 and system memory 1020 represent the user's core computing power. The core computing power may also include high performance devices 1050 such as advanced graphics processor chips that greatly increase overall system performance and which, because of their speed, need to be located close to the CPU 1010. The primary mass storage 1030 contains persistent copies of the operating system software, application software, configuration data, and user data. The software and data stored in the primary mass storage device 1030 represent the user's computing environment. Interface and support circuitry 1040 primarily includes interface chips and signal busses that interconnect the CPU 1010, system memory 1020, high performance devices 1050, and primary mass storage 1030. The interface and support circuitry 1040 also connects ACM-resident components with the ACM-to-PCON interconnection apparatus 1003 as needed.*

*Within the PCON 1001, the primary display component 1011 may include an integrated display device or connection circuitry for an external display device. This primary display device 1011 may be, for example, an LCD, plasma, or CRT display screen used to display text and graphics to the user for interaction with the operating system and application software. The primary display component 1011 is the primary output of the computer system, i.e., the paramount vehicle by which programs executing on the CPU 1010 can communicate toward the user.*

*The primary input component 1021 of the PCON 1001 may include an integrated input device or connection circuitry for attachment to an external input device. The primary input 1021 may be, for example, a keyboard, touch screen, keypad, mouse, trackball, digitizing pad, or some combination thereof to enable the user to interact with the operating system and application software. The primary input component 1021 is the paramount vehicle by which programs executing on the CPU 1010 receive signals from the user.*

*The PCON 1001 may contain secondary mass storage 1051 to provide additional high capacity storage for data and software. Secondary mass storage 1051 may have fixed or*

*removable media and may include, for example, devices such as diskette drives, hard disks, CD-ROM drives, DVD drives, and tape drives.*

*The PCON 1001 may be enhanced with additional capability through the use of integrated "Other Devices" 1061 or add-on cards inserted into the PCON's expansion slots 1071. Examples of additional capability include sound generators, LAN connections, and modems. Interface and support circuitry 1041 primarily includes interface chips, driver chips, and signal busses that interconnect the other components within the PCON 1001. The interface and support circuitry 1041 also connects PCON-resident components with the ACM-to-PCON interconnection apparatus 1003 as needed.*

*Importantly, the PCON 1001 houses the primary power supply 1031. The primary power supply 1031 has sufficient capacity to power both the PCON 1001 and the ACM 1000 for normal operation. Note that the ACM 1000 may include a secondary "power supply" in the form, for example, of a small battery. Such a power supply would be included in the ACM 1000 to maintain, for example, a time-of-day clock, configuration settings when the ACM 1000 is not attached to a PCON, or machine state when moving an active ACM immediately from one PCON to another. The total energy stored in such a battery would, however, be insufficient to sustain operation of the CPU 1010 at its rated speed, along with the memory 1020 and primary mass storage 1030, for more than a fraction of an hour, if the battery were able to deliver the required level of electrical current at all.*

Figure 11:
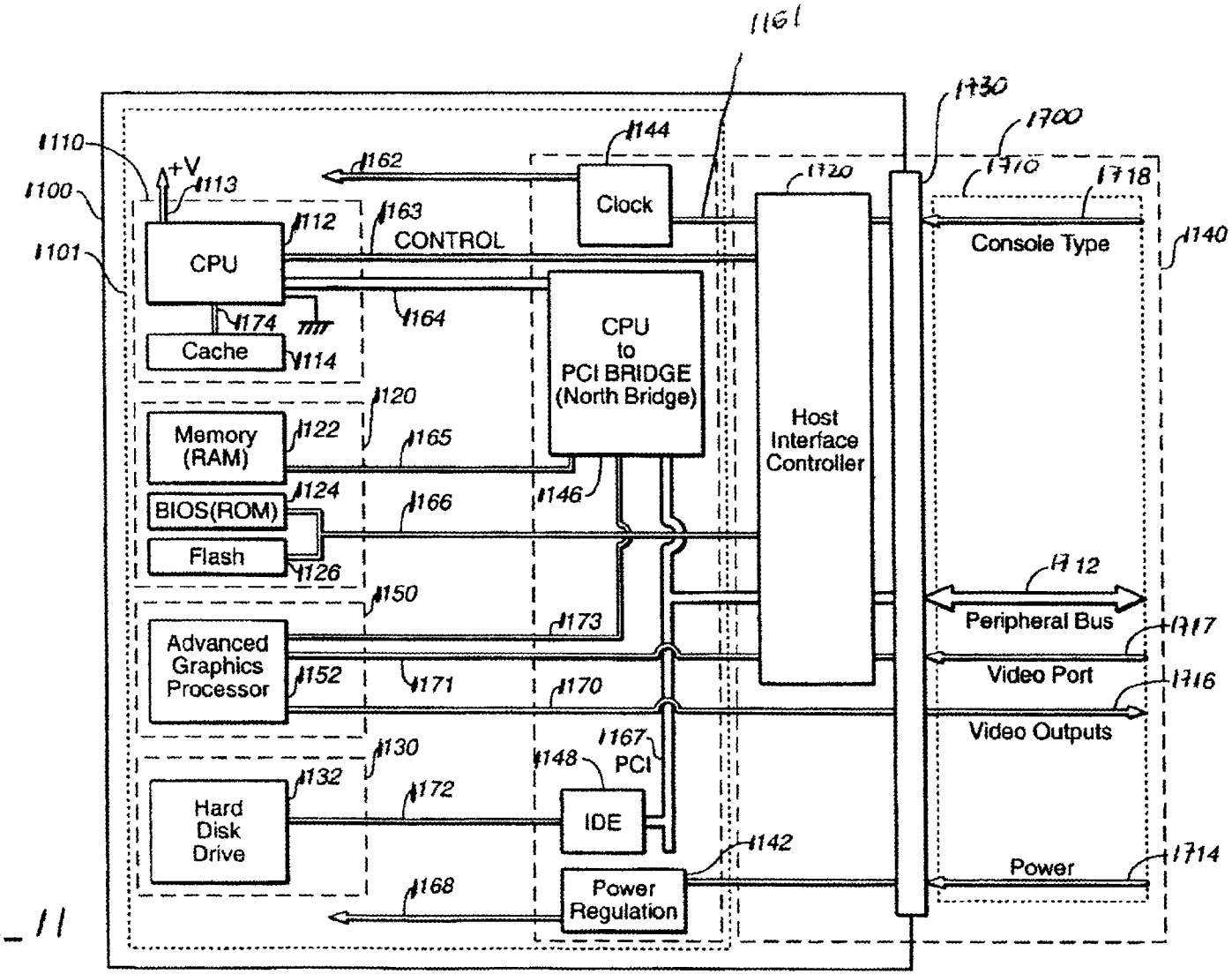
*FIG. 11 is a block diagram of an attached computing module (ACM).*

*FIG. 11 is a block diagram of an attached computing module (ACM) 1100. The physical ACM package 1100 contains the ACM functional components 1101 and the ACM side of the ACM-to-PCON Interconnection 1700. The ACM 1101 comprises a CPU component 1110, a system memory component 1120, a primary mass storage component 1130, a high performance devices components 1150, and an interface and support component 1140.*

*The ACM side of the ACM-to-PCON Interconnection 1700 comprises a Host Interface Controller (HIC) component 1720 and an ACM connector component 1730. The HIC 1720 and connector 1730 components couple the ACM functional components 1100 with the signals of an ACM-to-PCON interface bus 1710 used to operatively connect an ACM with a PCON. The ACM-to-PCON interface bus 1710 comprises conveyance for electrical power 1714 and signals for a peripheral bus 1712, video 1716, video port 1717, and console type 1718. The preferred ACM-to-PCON Interconnection 1700 is described in detail in a companion U.S. patent application Ser. No. 09/149,882, entitled "A Communication Channel and Interface Devices for Bridging Computer Interface Buses," by the same inventor, filed on Sep. 8, 1998, and hereby incorporated by reference. The preferred ACM-to-PCON interconnection 1700 includes circuitry to transmit and receive parallel bus information from multiple signal paths as a serial bit stream on a single signal path. This reduces the number of physical signal paths required to traverse the interconnection 1700. Further, employing low-voltage differential signaling (LVDS) on the bit stream data paths provides very reliable, high-speed transmission across cables. This represents a further advantage of the present invention.*

*Clocking circuitry 1144 generates clock signals for distribution to other components within the ACM 1100 that require a timing and synchronization clock source. The CPU 1110 is one such component. Often, the total power dissipated by a CPU is directly proportional to the frequency of its main clock signal. The presently described embodiment of the ACM 1100 includes circuitry that can vary the frequency of the main CPU clock signal conveyed to the CPU 1110 via signal path 1162, in response to a signal received from the host interface controller (HIC) 1720 via signal path 1161. The generation and variable frequency control of clocking signals is well understood in the art. By varying the frequency, the power consumption of the CPU 1110 (and thus the entire ACM 1100) can be varied.*

*The variable clock rate generation may be exploited to match the CPU power consumption to the available electrical power. Circuitry in the host interface controller (HIC) 1720 of the presently described embodiment adjusts the frequency control signal sent via signal path 1161 to the clocking circuitry 1144, based on the "console type" information signal 1718 conveyed from the peripheral console (PCON) by the CPU-to-PCON interconnection 1700.*

Figure 12:
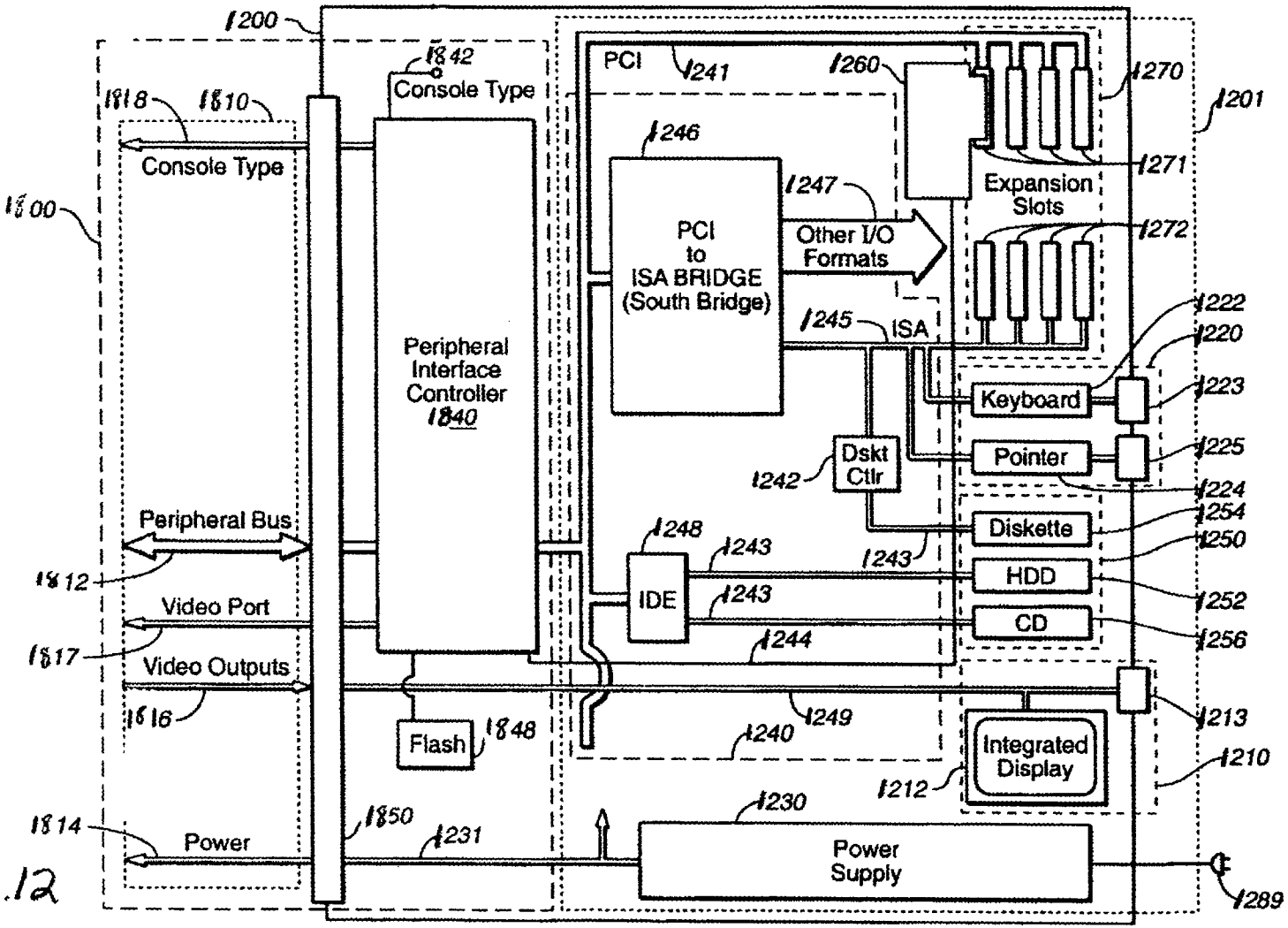
*FIG. 12 is a block diagram of a peripheral console (PCON).*

*FIG. 12 is a block diagram of a peripheral console (PCON). A peripheral console couples with an ACM to form an operating personal computer system. The peripheral console (PCON) supplies an ACM with primary input, display, and power supply; the ACM supplies the core computing power and environment of the user. In the presently described embodiment the physical PCON package 1200 contains the PCON functional components 1201 and the PCON side of the ACM-to-PCON Interconnection 1800. The PCON functional components 1201 comprise primary display 1210, a primary input 1220, a primary power supply 1230, interface and support 1240, secondary mass storage 1250, other devices 1260, and expansion slots 1270.*

*The PCON side of the ACM-to-PCON Interconnection 1800 comprises a Peripheral Interface Controller (PIC) component 1840, a PCON connector component 1850, console-type component 1842, and flash memory device 1848. The PIC 1840 and connector 1850 components couple the PCON functional components 1201 with the signals of an ACM-to-PCON interface bus 1810 used to operatively connect an ACM with a PCON. The ACM-to-PCON interface bus 1810 comprises conveyance for electrical power 1814 and signals for a peripheral bus 1812, video 1816, video port 1817, and console-type 1818. The preferred ACM-to-PCON Interconnection 1800 is described in detail in the U.S. patent application entitled "A Communication Channel and Interface Devices for Bridging Computer Interface Buses," already incorporated herein by reference.*

*Connector component 1850 may be selected to mate directly with the connector component 1730 of an ACM (shown in FIG. 11). Alternatively, connector component 1850 may be selected to mate with, for example, the connector on one end of a cable intervening between the PCON and an ACM in a particular embodiment. The ACM-to-PCON interconnection described in the aforementioned companion patent application has the advantage of providing reliable signal conveyance across low cost cables.*

*Flash memory device 1848 provides non-volatile storage. This storage may be accessible to devices in both the ACM and the PCON, including the host interface controller and the peripheral interface controller 1840 to which it is connected. As such, flash memory 1848 may be used to store configuration and security data to facilitate an intelligent mating between an ACM and a PCON that needs no participation of the CPU.*

*The secondary mass storage component 1250 of the PCON functional circuitry 1201 of the presently described embodiment comprises diskette drive 1254, hard disk drive 1252, and CD-ROM drive 1256. Secondary mass storage 1250 generally provides low-cost, non-volatile storage for data files which may include software program files. Data files stored on secondary mass storage 1250 are not part of a computer*

*user's core computing power and environment. Secondary mass storage 1250 may be used to store, for example, seldom used software programs, software programs that are used only with companion hardware devices installed in the same peripheral console 1200, or archival copies of data files that are maintained in primary mass storage 1130 of an ACM (shown in FIG. 11). Storage capacities for secondary mass storage 1250 devices may vary from the 1.44 megabytes of the 3.5-inch high density diskette drive 1254, to more than 10 gigabytes for a large format (5-inch) hard disk drive 1252. Hard disk drive 1252 employs fixed recording media, while diskette drive 1254 and CD-ROM drive 1256 employ removable media. Diskette drive 1254 and hard disk drive 1252 support both read and write operations (i.e., data stored on their recording media may be both recalled and modified) while CD-ROM drive 1256 supports only read operations.*

*Two PCI or PCI-like buses are interfaced using a non-PCI or non-PCI-like channel. PCI control signals are encoded into control bits, and the control bits, rather than the control signals that they represent, and are transmitted on the interface channel. At the receiving end, the control bits representing control signals are decoded back into PCI control signals prior to being transmitted to the intended PCI bus.*

*The fact that control bits rather than control signals are transmitted on the interface channel allows using a smaller number of signal channels and a correspondingly small number of conductive lines in the interface channel than would otherwise be possible. This is because the control bits can be more easily multiplexed at one end of the interface channel and recovered at the other end than control signals. This relatively small number of signal channels used in the interface channel allows using LVDS channels for the interface. As mentioned above, an LVDS channel is more cable friendly, faster, consumes less power, and generates less noise than a PCI bus channel. Therefore, an LVDS channel is advantageously used for the hereto unused purpose of interfacing PCI or PCI-like buses. The relatively smaller number of signal channels in the interface also allows using connectors having smaller pins counts. As mentioned above an interface having a smaller number of signal channels and, therefore, a smaller number of conductive lines is less bulky and less expensive than one having a larger number of signal channels. Similarly, connectors having a smaller number of pins are also less expensive and less bulky than connectors having a larger number of pins.*

*In one embodiment, the present invention encompasses an apparatus for bridging a first computer interface bus and a second computer interface bus, in a microprocessor based computer system where each of the first and second computer interface buses have a number of parallel multiplexed address/data bus lines and operate at a clock speed in a predetermined clock speed range having a minimum clock speed and a maximum clock speed. The apparatus comprises an interface channel having a clock channel and a plurality of bit channels for transmitting bits; a first interface controller coupled to the first computer interface bus and to the interface channel to encode first control signals from the first computer interface bus into first control bits to be transmitted on the interface channel and to decode second control bits received from the interface channel into second control signals to be transmitted to the first computer interface bus; and a second interface controller coupled to the interface channel and the second computer interface bus to decode the first control bits from the interface channel into third control signals to be transmitted on the second computer interface bus and to encode fourth control signals from the second computer interface bus into the second control bits to be transmitted on the interface channel.*

*In one embodiment, the first and second interface controllers comprise a host interface controller (HIC) and a peripheral interface controller (PIC), respectively, the first and second computer interface buses comprise a primary PCI and a secondary PCI bus, respectively, and the interface channel comprises an LVDS channel.*

*In a preferred embodiment, the interface channel has a plurality of serial bit channels numbering fewer than the number of parallel bus lines in each of the PCI buses and operates at a clock speed higher than the clock speed at which any of the bus lines operates. More specifically, the interface channel includes two sets of unidirectional serial bit channels which transmit data in opposite directions such that one set of bit channels transmits serial bits from the HIC to the PIC while the other set transmits serial bits from the PIC to the HIC. For each cycle of the PCI clock, each bit channel of the interface channel transmits a packet of serial bits.*

*The HIC and PIC each include a bus controller to interface with the first and second computer interface buses, respectively, and to manage transactions that occur therewith. The HIC and PIC also include a translator coupled to the bus controller to encode control signals from the first and second computer interface buses, respectively, into control bits and to decode control bits from the interface channel into control signals. Additionally, the HIC and PIC each include a transmitter and a receiver coupled to the translator. The transmitter converts parallel bits into serial bits and transmits the serial bits to the interface channel. The receiver receives serial bits from the interface channel and converts them into parallel bits.*

Figure 13:
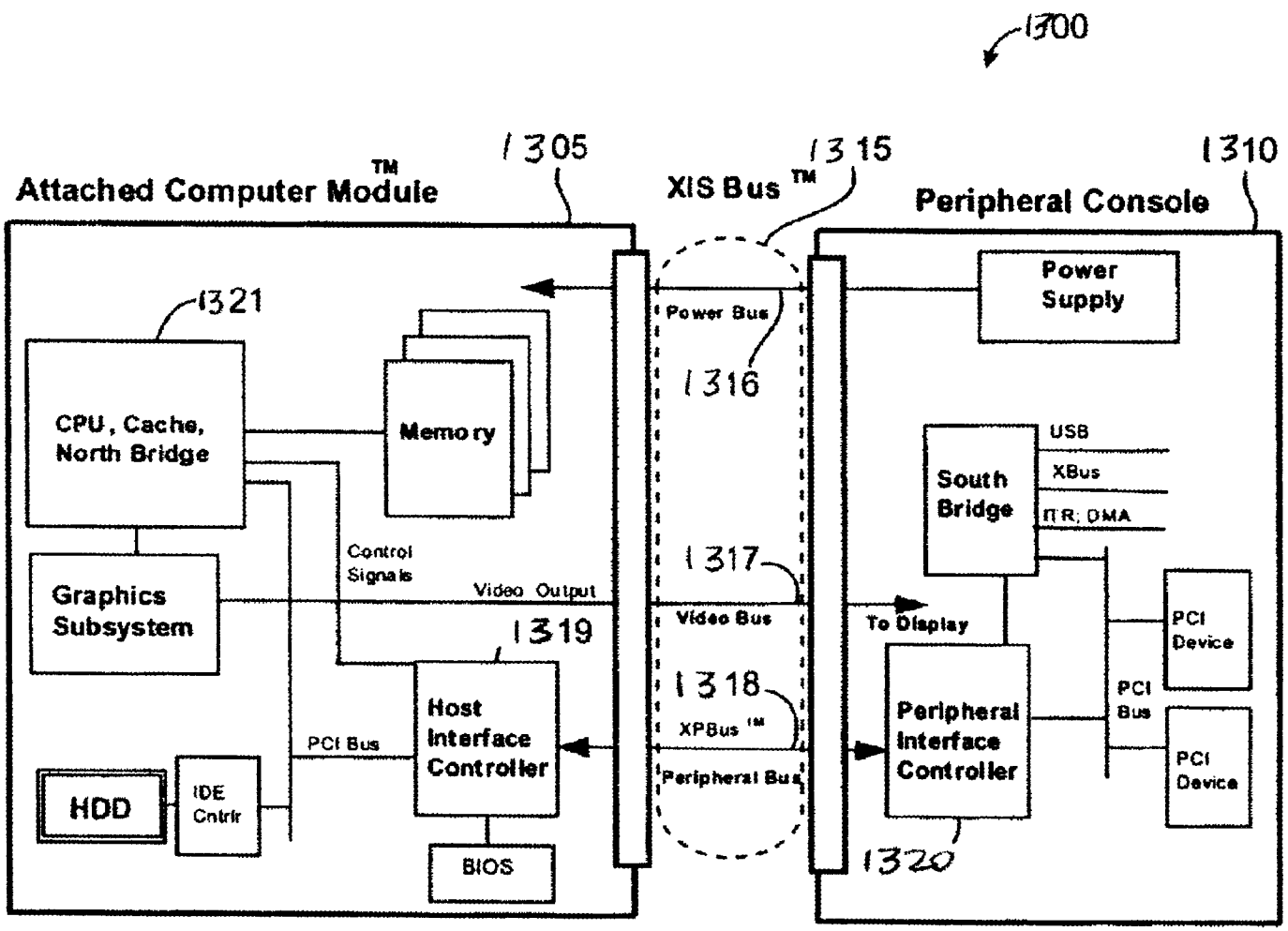
*FIG. 13 is a block diagram of one embodiment of a computer system using the interface of the present invention.*

*FIG. 13 is a block diagram of one embodiment of a computer system 1300 using the interface of the present invention. Computer system 1300 includes an attached computer module (ACM) 1305 and a peripheral console 1310, which are described in greater detail in the application of William W. Y. Chu, Ser. No. 09/149,548, for "Personal Computer Peripheral Console With Attached Computer Module" filed on Sep. 8, 1998 and incorporated herein by reference. The ACM 1305 and the peripheral console 1310 are interfaced through an exchange interface system (XIS) bus 1315. The XIS bus 1315 includes power bus 1316, video bus 1317 and peripheral bus (XPBus) 1318, which is also herein referred to as an interface channel. The power bus 1316 transmits power between ACM 1305 and peripheral console 1310. In a preferred embodiment power bus 1316 transmits power at voltage levels of 3.3 volts, 5 volts and 12 volts. Video bus 1317 transmits video signals between the ACM 1305 and the peripheral console 1310. In a preferred embodiment, the video bus 1317 transmits analog Red Green Blue (RGB) video signals for color monitors, digital video signals (such as Video Electronics Standards Association (VESA) Plug and Display's Transition Minimized Differential Signaling (TMDS) signals for flat panel displays), and television (TV) and/or super video (S-video) signals. The XPBus 1318 is coupled to host interface controller (HIC) 1319 and to peripheral interface controller (PIC) 1320, which is also sometimes referred to as a bay interface controller.*

Figure 17:
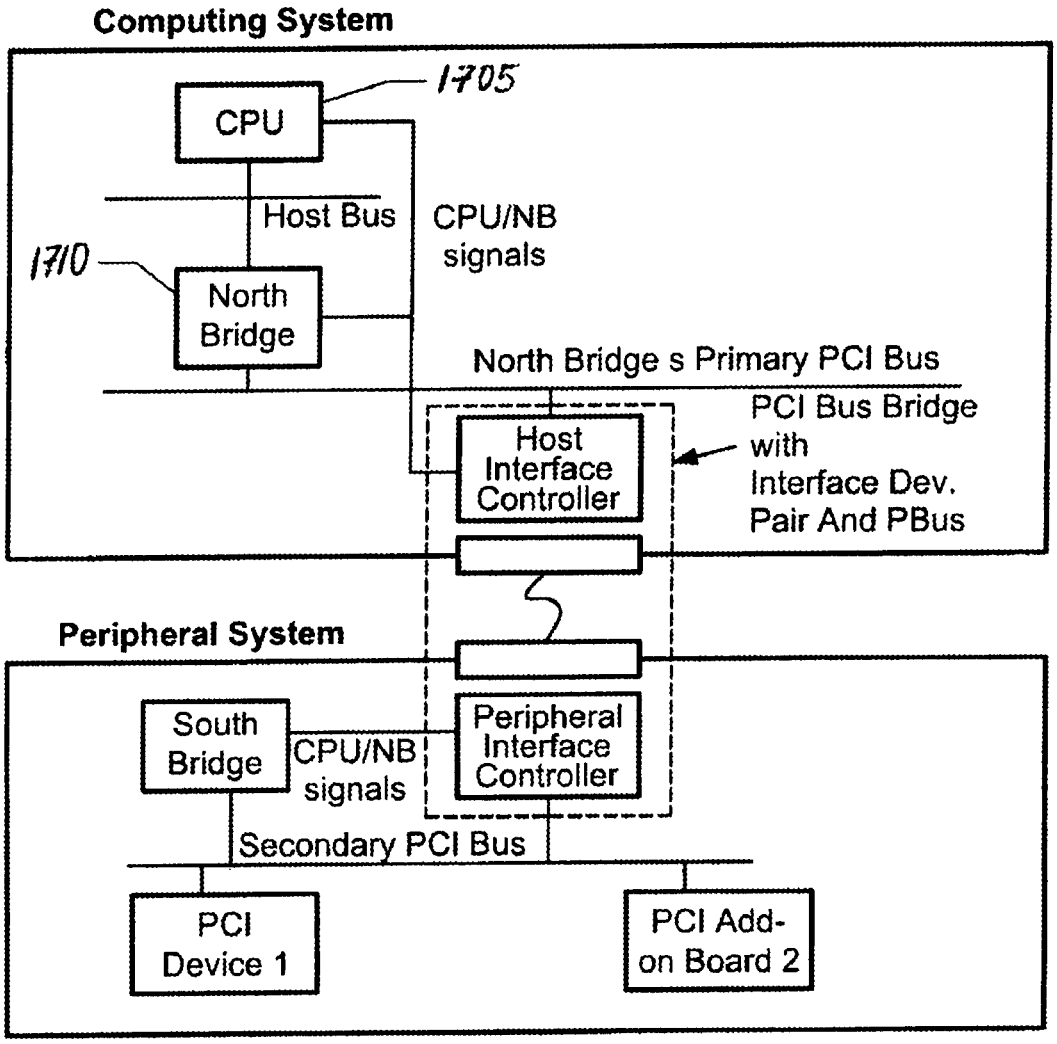
*FIG. 17 is a partial block diagram of a computer system using the interface of the present invention as a bridge between the north and south bridges of the computer system.*
Figure 18:
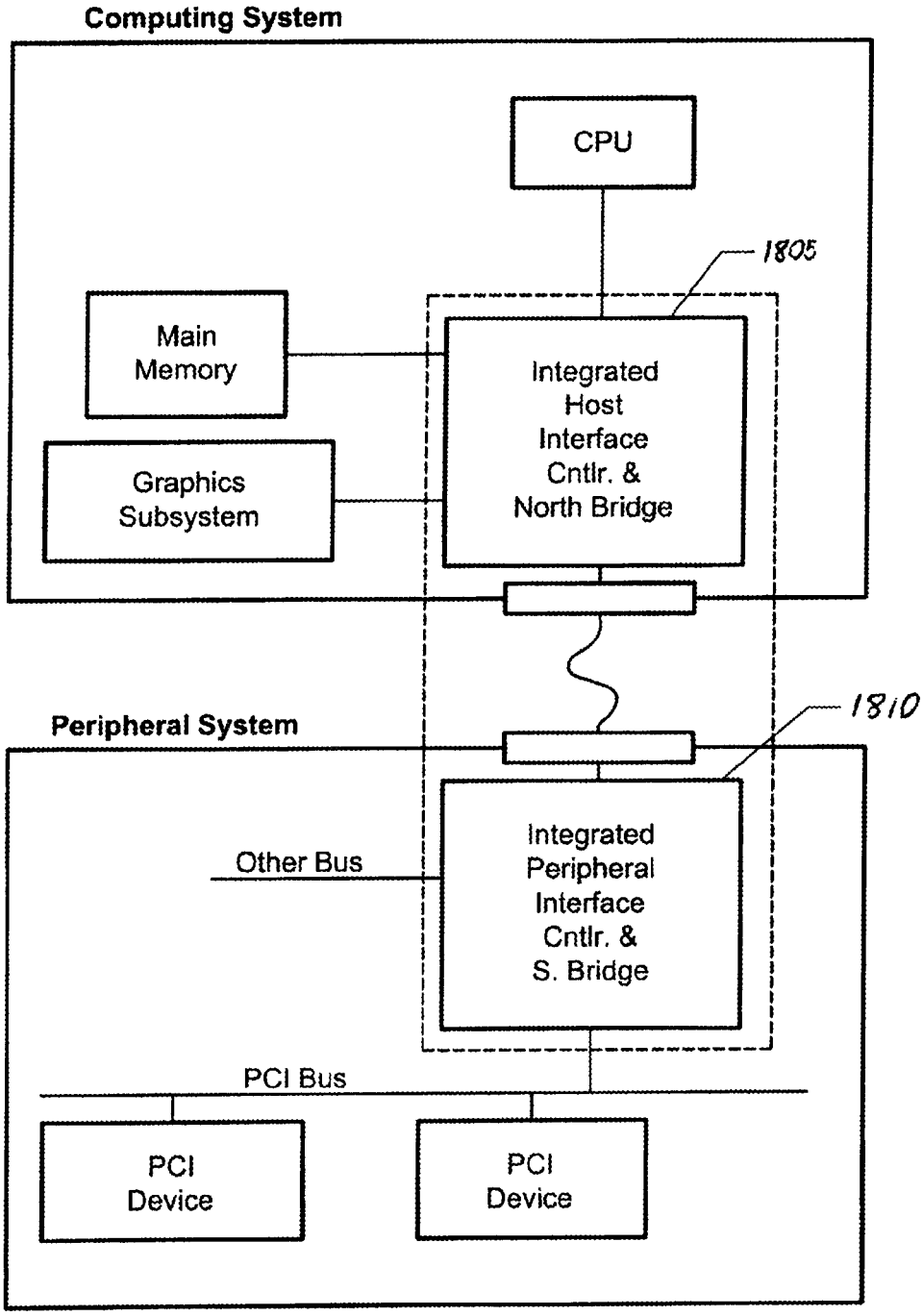
*FIG. 18 is a partial block diagram of a computer system in which the north and south bridges are integrated with the host and peripheral interface controllers, respectively.*

*In the embodiment shown in FIG. 13, HIC 1319 is coupled to an integrated unit 1321 that includes a CPU, a cache and a north bridge. In another embodiment, such as that shown in FIG. 17, the CPU 1705 and north bridge 1710 are separate rather than integrated units. In yet another embodiment, such as that shown in FIG. 18, the HIC and PIC are integrated with the north and south bridges, respectively, such that integrated*

Figure 19:
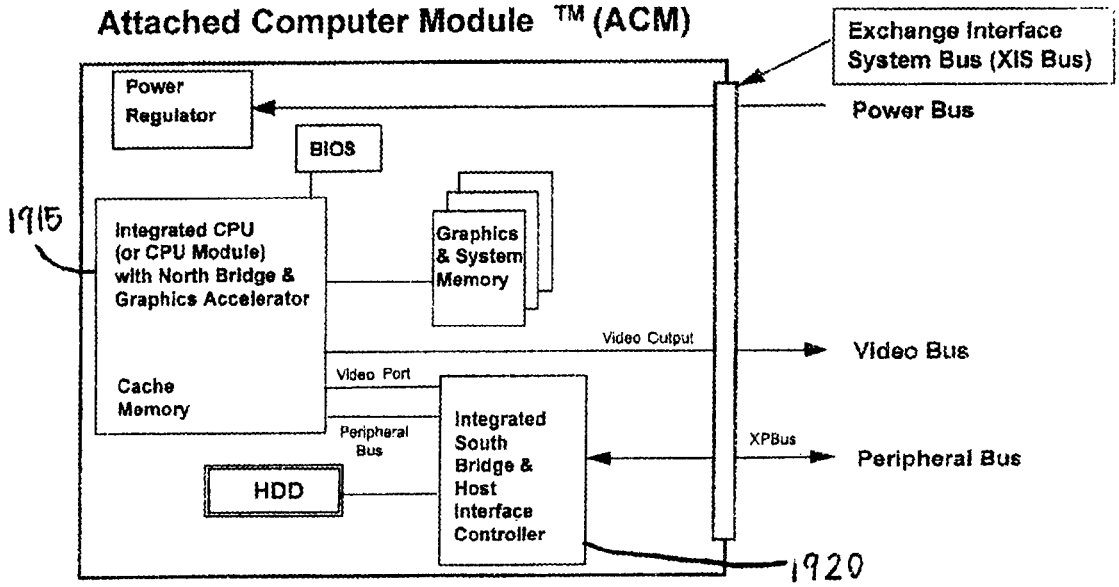
*FIG. 19 shows an attached computer module with Integrated CPU/NB/Graphics and Integrated HIC/SB.*
Figure 20:
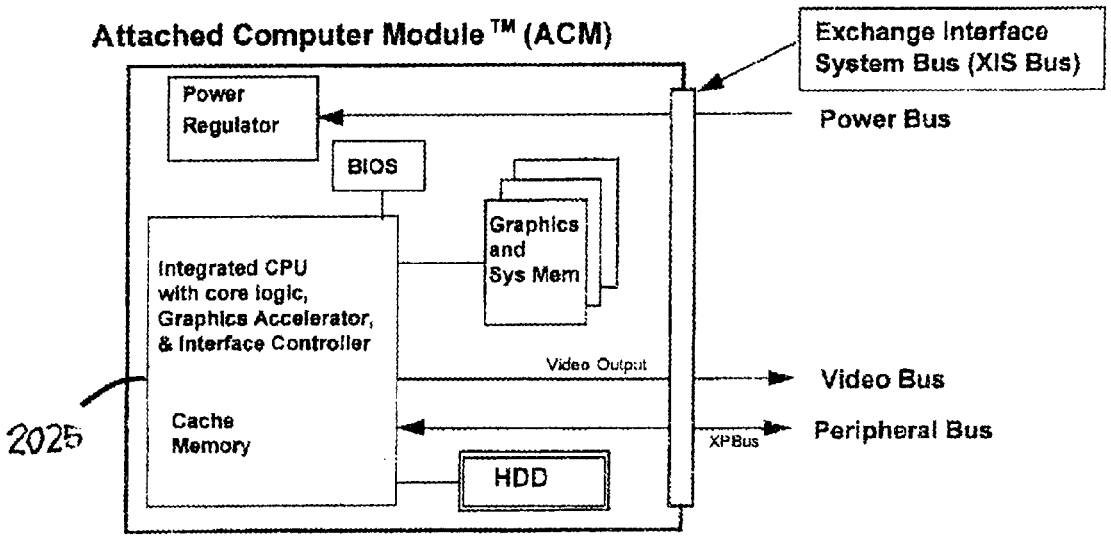
*FIG. 20 shows an attached computer module with single chip fully integrated: CPU, Cache, Core Logic, Graphics controller and Interface controller.*

*HIC and north bridge unit 1805 includes an HIC and a north bridge, while integrated PIC and south bridge unit 1810 includes a PIC and a south bridge. FIG. 19 shows an attached computer module with integrated CPU/NB/Graphics 1915 and Integrated HIC/SB 1920. FIG. 20 shows an attached computer module with single chip 2025 fully integrated: CPU, Cache, Core Logic, Graphics controller and Interface controller.*

Figure 14:
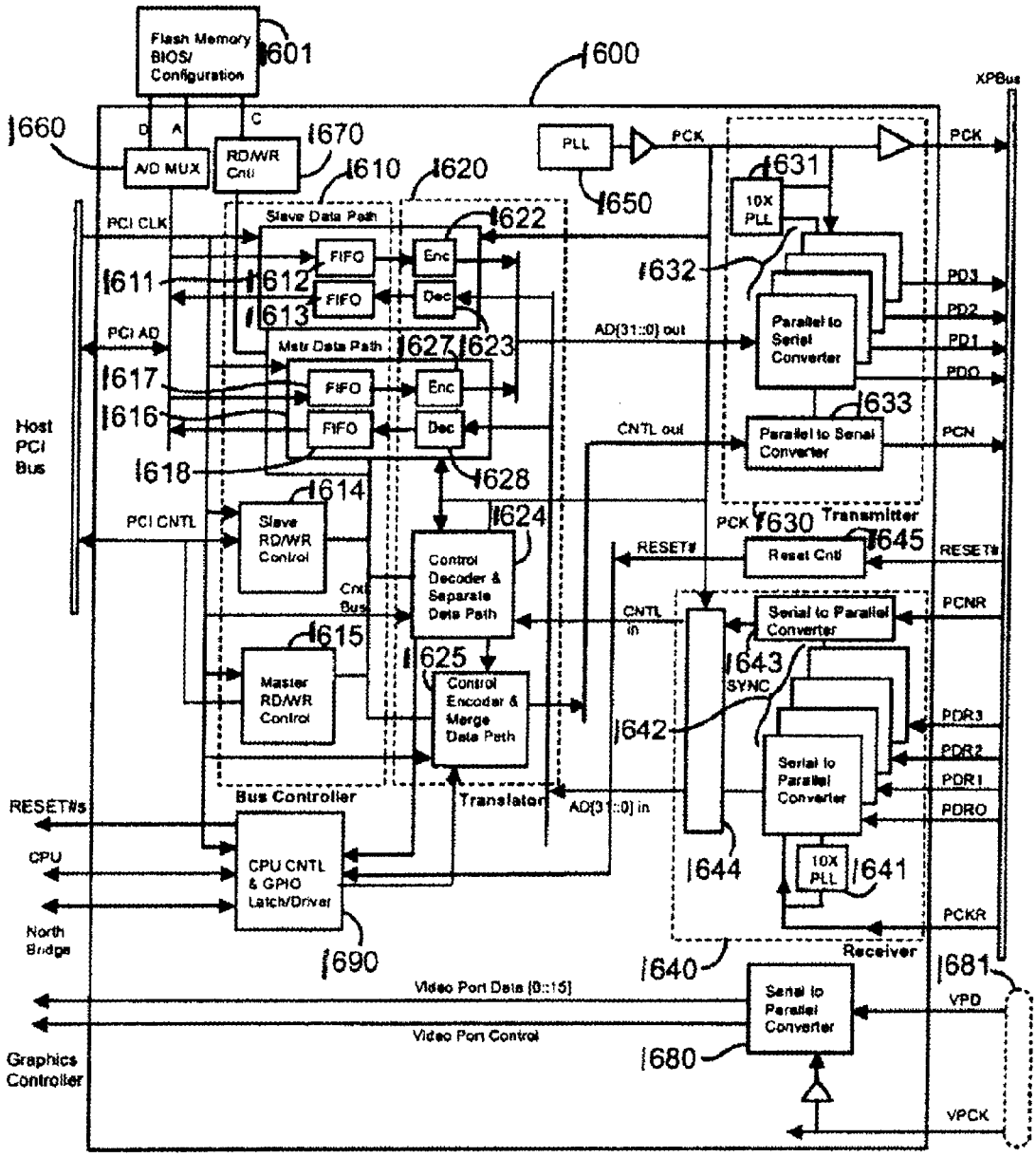
*FIG. 14 is a detailed block diagram of one embodiment of the host interface controller of the present invention.*

*FIG. 14 is a detailed block diagram of one embodiment of the HIC of the present invention. As shown in FIG. 14, HIC 1600 comprises bus controller 1610, translator 1620, transmitter 1630, receiver 1640, a PLL 1650, an address/data multiplexer (A/D MUX) 1660, a read/write controller (RD/WR Cntl) 1670, a video serial to parallel converter 1680 and a CPU control & general purpose input/output latch/driver (CPU CNTL & GPIO latch/driver) 1690.*

*HIC 1600 is coupled to an optional flash memory BIOS configuration unit 1601. Flash memory unit 1601 stores basic input output system (BIOS) and PCI configuration information and supplies the BIOS and PCI configuration information to A/D MUX 1660 and RD/WR Control 1670, which control the programming, read, and write of flash memory unit 1601.*

*Bus controller 1610 is coupled to the host PCI bus, which is also referred to herein as the primary PCI bus, and manages PCI bus transactions on the host PCI bus. Bus controller 1610 includes a slave (target) unit 1611 and a master unit 1616. Both slave unit 1611 and master unit 1616 each include two first in first out (FIFO) buffers, which are preferably asynchronous with respect to each other since the input and output of the two FIFOs in the master unit 1616 as well as the two FIFOs in the slave unit 1611 are clocked by different clocks, namely the PCI clock and the PCK. Additionally, slave unit 1611 includes encoder 1622 and decoder 1623, while master unit 1616 includes encoder 1627 and decoder 1628. The FIFOs 1612, 1613, 1617 and 1618 manage data transfers between the host PCI bus and the XPBus, which in the embodiment shown in FIG. 14 operate at 33 MHz and 66 MHz, respectively. PCI address/data (AD) from the host PCI bus is entered into FIFOs 1612 and 1617 before they are encoded by encoders 1622 and 1627. Encoders 1622 and 1627 format the PCI address/data bits to a form more suitable for parallel to serial conversion prior to transmittal on the XPBus. Similarly, address and data information from the receivers is decoded by decoders 1623 and 1628 to a form more suitable for transmission on the host PCI bus.*

*The multiplexed parallel A/D bits and some control bits input to transmitter 1630 are serialized by parallel to serial converters 1632 of transmitter 1630 into 10 bit packets. These bit packets are then output on data lines PD0 to PD3 of the XPBus. Other control bits are serialized by parallel to serial converter 1633 into 10 bit packets and sent out on control line PCN of the XPBus.*

Figure 15:
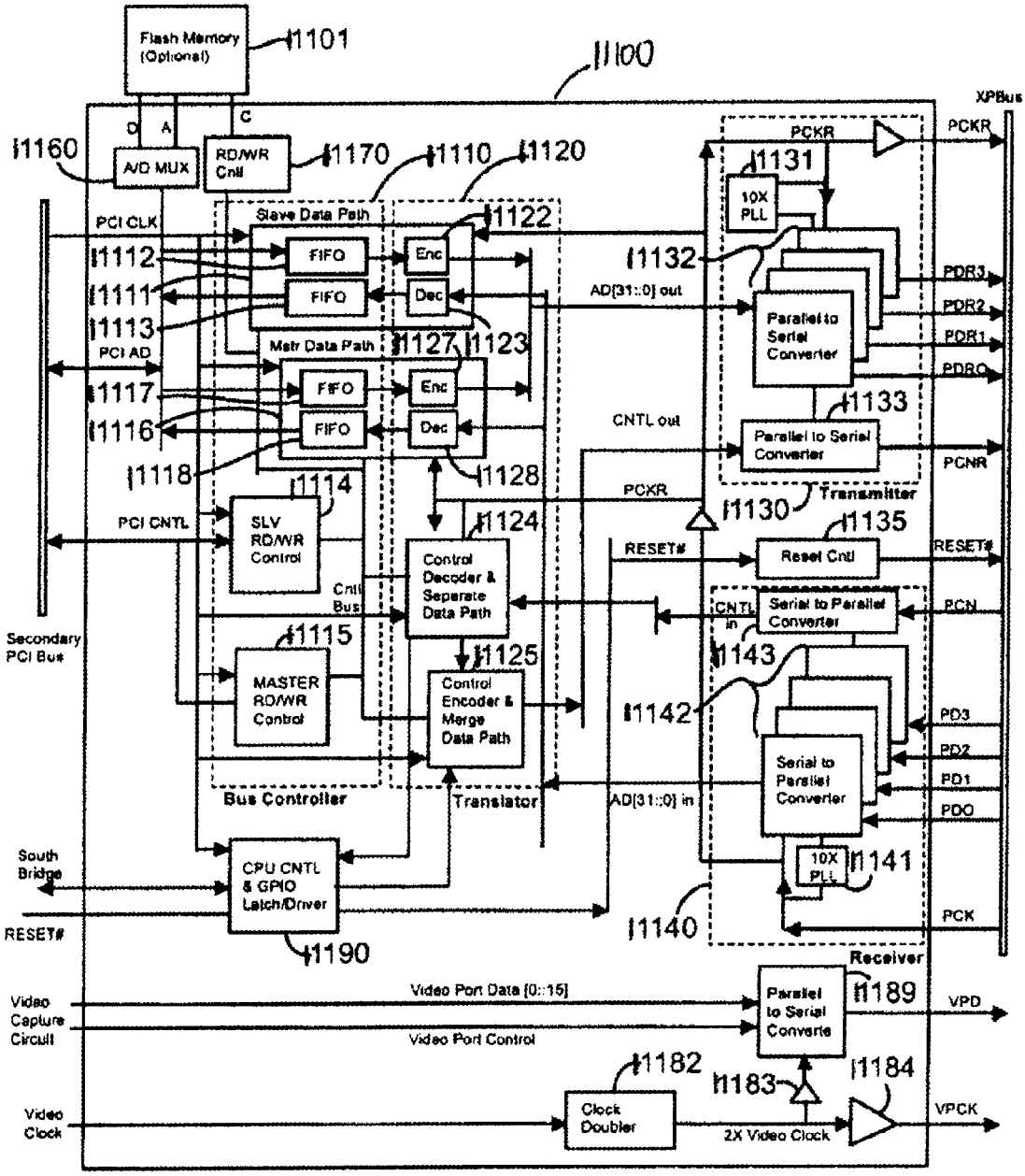
*FIG. 15 is a detailed block diagram of one embodiment of the PIC of the present invention.*

*FIG. 15 is a detailed block diagram of one embodiment of the PIC of the present invention. PIC 11100 is nearly identical to HIC 1600 in its function, except that HIC 1600 interfaces the host PCI bus to the XPBus while PIC 11100 interfaces the secondary PCI bus to the XPBus. Similarly, the components in PIC 11100 serve the same function as their corresponding components in HIC 1600. Reference numbers for components in PIC 11100 have been selected such that a component in PIC 11100 and its corresponding component in HIC 1600 have reference numbers having the same two least significant digits. Thus for example, the bus controller in PIC 11100 is referenced as bus controller 11110 while the bus controller in HIC 1600 is referenced as bus controller 1610. As many of the elements in PIC 11100 serve the same functions as those served by their corresponding elements in HIC 1600 and as the functions of the corresponding elements in HIC 1600 have been described in detail above, the function of elements of PIC 11100 having corresponding elements in HIC 1600 will not be further described herein. Reference may be made to the above description of FIG. 14 for an understanding of the functions of the elements of PIC 11100 having corresponding elements in HIC 1600.*

Figure 16:
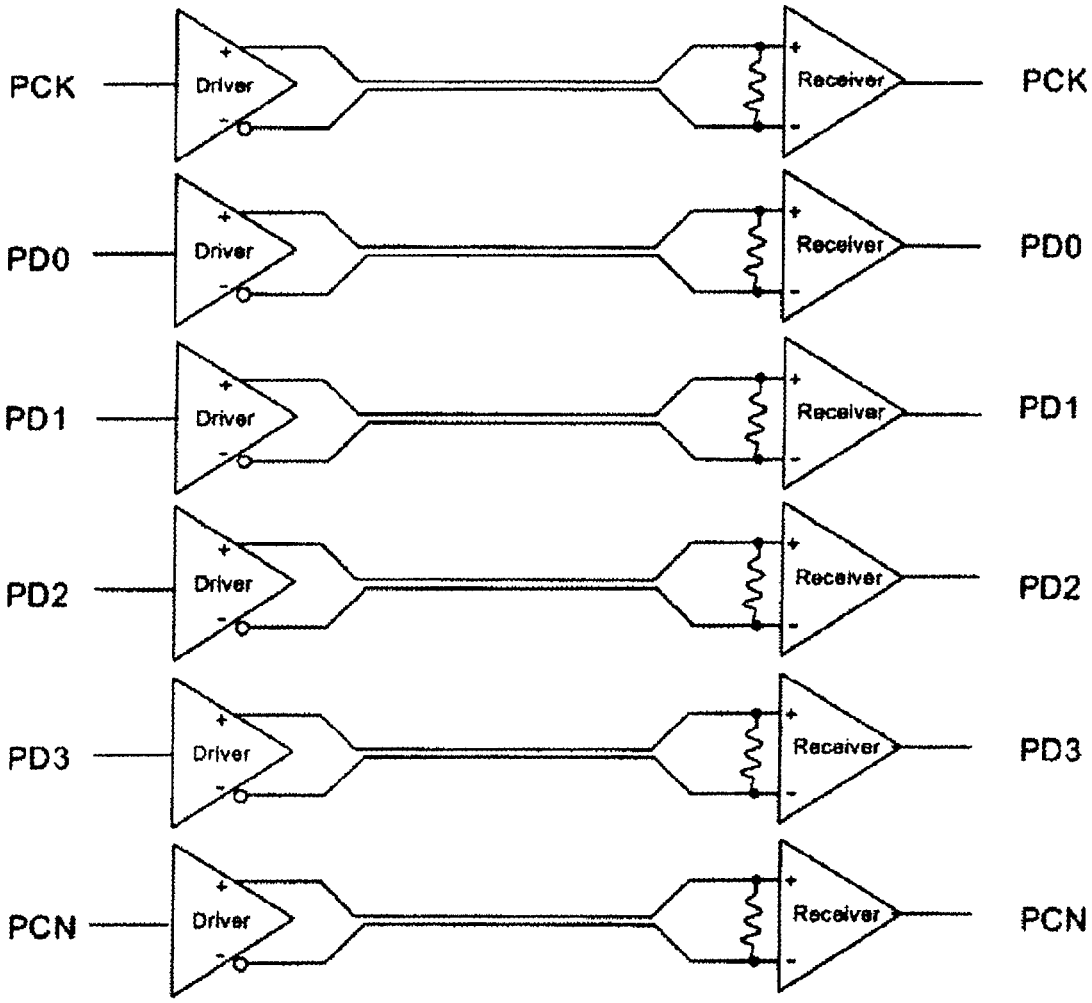
*FIG. 16 is a schematic diagram of the signal lines PCK, PD0 to PD3, and PCN.*

*FIG. 16 is a schematic diagram of lines PCK, PD0 to PD3, and PCN. These lines are unidirectional LVDS lines for transmitting clock signals and bits from the HIC to the PIC. The bits on the PD0 to PD3 and the PCN lines are sent synchronously within every clock cycle of the PCK. Another set of lines, namely PCKR, PDR0 to PDR3, and PCNR, are used to transmit clock signals and bits from the PIC to HIC. The lines used for transmitting information from the PIC to the HIC have the same structure as those shown in FIG. 16, except that they transmit data in a direction opposite to that in which the lines shown in FIG. 16 transmit data. In other words they transmit information from the PIC to the HIC. The bits on the PDR0 to PDR3 and the PCNR lines are sent synchronously within every clock cycle of the PCKR. Some of the examples of control information that may be sent in the reverse direction, i.e., on PCNR line, include a request to switch data bus direction because of a pending operation (such as read data available), a control signal change in the target requiring communication in the reverse direction, target busy, and transmission error detected.*

*The XPBus which includes lines PCK, PD0 to PD3, PCN, PCKR, PDR0 to PDR3, and PCNR, has two sets of unidirectional lines transmitting clock signals and bits in opposite directions. The first set of unidirectional lines includes PCK, PD0 to PD3, and PCN. The second set of unidirectional lines includes PCKR, PDR0 to PDR3, and PCNR. Each of these unidirectional set of lines is a point-to-point bus with a fixed transmitter and receiver, or in other words a fixed master and slave bus. For the first set of unidirectional lines, the HIC is a fixed transmitter/master whereas the PIC is a fixed receiver/slave. For the second set of unidirectional lines, the PIC is a fixed transmitter/master whereas the HIC is a fixed receiver/slave. The LVDS lines of XPBus, a cable friendly and remote system I/O bus, transmit fixed length data packets within a clock cycle.*

*The XPBus lines, PD0 to PD3, PCN, PDR0 to PDR3 and PCNR, and the video data and clock lines, VPD and VPCK, are not limited to being LVDS lines, as they may be other forms of bit based lines. For example, in another embodiment, the XPBus lines may be IEEE 1394 lines.*

*It is to be noted that although each of the lines PCK, PD0 to PD3, PCN, PCKR, PDR0 to PDR3, PCNR, VPCK, and VPD is referred to as a line, in the singular rather than plural, each such line may contain more than one physical line. For example, in the embodiment shown in FIG. 16, each of lines PCK, PD0 to PD3 and PCN includes two physical lines between each driver and its corresponding receiver. The term line, when not directly preceded by the terms physical or conductive, is herein used interchangeably with a signal or bit channel of one or more physical lines for transmitting a signal. In the case of non-differential signal lines, generally only one physical line is used to transmit one signal. However, in the case of differential signal lines, a pair of physical lines is used to transmit one signal. For example, a pair of physical lines together transmit a signal in a bit line or bit channel in an LVDS or IEEE 1394 interface.*

*A bit based line (i.e., a bit line) is a line for transmitting serial bits. Bit based lines typically transmit bit packets and*

*use a serial data packet protocol. Examples of bit lines include an LVDS line, an IEEE 1394 line, and a Universal Serial Bus (USB) line.*

*FIGS. 21 and 22 are tables including the pin number, symbol, signal, standard and description for the pins on the peripheral and video connectors, respectively. FIG. 23 is a table showing the symbols, signals, data rate and description of signals on the XPBus, where RTN indicates a ground (GND) reference. In the above tables, P&D stands for plug and display and is a trademark of the Video Electronics Standards Association (VESA) for the Plug and Display standard, DDC2:SCL and DDC2:SDA stand for the VESA display data channel (DDC) standard 2 clock and data signals, respectively, SV stands for super video, V33 is 3.3 volts, and V5 is 5.0 volts. TMDS stands for Transition Minimized Differential Signaling and is a trademark of Silicon Images and refers to their Panel Link technology, which is in turn a trademark for their LVDS technology. TMDS is used herein to refer to the Panel Link technology or technologies compatible therewith.*

*The reserved data packet types can be used to support non-PCI bus transactions, e.g., USB transactions. The bits sent in the first nibble of each data packet indicate the type of the data packet. FIG. 24 is a table showing different types of first nibbles and their corresponding data pacekt types.*

Although the functionality above has been generally described in terms of a specific sequence of steps, other steps can also be used. Here, the steps can be implemented in a combination of hardware, firmware, and software. Either of these can be further combined or even separated. Depending upon the embodiment, the functionality can be implemented in a number of different ways without departing from the spirit and scope of the claims herein. One of ordinary skill in the art would recognize other variations, modifications, and alternatives.

While the above is a full description of the specific embodiments, various modifications, alternative constructions and equivalents may be used. Therefore, the above description and illustrations should not be taken as limiting the scope of the present invention which is defined by the appended claims.

What is claimed is:

[1. A security protection method for a computer module, said method comprising:

inserting the computer module into a console;

initiating a security program in said module to read a security identification of said console and to read a security identification of said computer module;

determining of a predetermined security status based upon a relationship of said console identification and said computer module identification;

selecting said predetermined security status; and operating said computer module based upon said security status.]

[2. The method of claim 1 wherein said predetermined security status disables a network access to the computer module.]

[3. The method of claim 1 wherein said predetermined security status disables a secondary storage of information from said computer module to substantially prevent information to be transferred from a memory of the computer module to said secondary storage.]

[4. The method of claim 1 wherein said security program is provided in a system BIOS.]

[5. The method of claim 1 wherein said step of initiating reads said security identification of said computer module from a flash memory device.]

[6. The method of claim 1 wherein said step of initiating reads said security identification of said console from a flash memory device.]

[7. The method of claim 1 wherein said console is selected from a desktop home computing device, an office desktop computing device, a mobile computing device, a television sot-top computing device, and a co-worker's computing device.]

[8. A system for secured information transactions, the system comprising:

a console comprising a peripheral controller housed in the console;

a user identification input device coupled to the peripheral controller, the user identification input device being provided for user identification data; and an attached computer module coupled to the console, the attached computer module comprising a security memory device stored with the user identification data.]

[9. The system of claim 8 wherein the user identification input device is a finger print reader.]

[10. The system of claim 8 wherein the user identification input device is a voice processing device.]

[11. A method for operating a module computer into one of a plurality of network systems, the method comprising:

providing a computer module, the module comprising a connection program;

inserting the computer module into a computer console, the computer console having access to a network;

receiving connection information from the computer console;

configuring the connection program to adapt to the connection information; and establish a connection between the computer module and a server coupled to the network.]

[12. The method of claim 11 wherein the connection information comprises a connection protocol for providing the connection.]

[13. The method of claim 12 wherein the connection protocol is selected from TCP/IP, or mobile IP.]

*14. A computer for information transactions, comprising:*

*a central processing unit directly connected to a first Low Voltage Differential Signal (LVDS) channel comprising two sets of unidirectional, serial bit channels to transmit data in opposite directions;*

*a main memory directly connected to the central processing unit; and*

*a peripheral bridge directly coupled to the central processing unit without any intervening Peripheral Component Interconnect ("PCI") bus, wherein the peripheral bridge directly conveys an encoded serial bit stream of address and data bits of a PCI bus transaction over a second LVDS channel comprising two sets of unidirectional, serial bit channels to transmit data in opposite directions.*

*15. The computer of claim 14, further comprising a connector coupled to a console, wherein the second LVDS channel communicates the encoded serial bit stream of address and data bits of the PCI bus transaction to the console.*

*16. The computer of claim 15 further comprising a graphics controller that conveys digital video display information from the connector to the console.*

*17. The computer of claim 15 wherein the console comprises a mass storage device that couples to the second LVDS channel.*

*18. A computer system, comprising:*

*a console comprising a Liquid Crystal Display (LCD) display and a first Low Voltage Differential Signal (LVDS)*

*channel comprising two sets of unidirectional, serial bit channels to transmit data in opposite directions; and*

*a computer coupled to the console through a connector, the computer comprising*

*an integrated central processing unit and graphics controller in a single chip directly connected to a second LVDS channel comprising two sets of unidirectional, serial bit channels to transmit data in opposite directions; and*

*a mass storage unit coupled to the central processing unit and graphics controller in a single chip;*

*wherein the graphics controller conveys digital video display information to the LCD display through the connector upon coupling to the console.*

*19. The computer system of claim 18 wherein the computer further comprises a peripheral bridge directly coupled to the central processing unit without any intervening Peripheral Component Interconnect ("PCI") bus, the peripheral bridge directly conveying an encoded serial bit stream of address and data bits of a PCI bus transaction.*

*20. The computer system of claim 19 wherein the peripheral bridge conveys the encoded serial bit stream of address and data bits of the PCI bus transaction to the first LVDS channel upon coupling of the computer to the console.*

*21. A computer, comprising:*

*a central processing unit directly connected to a first Low Voltage Differential Signal (LVDS) channel comprising two sets of unidirectional, serial bit channels to transmit Universal Serial Bus (USB) Protocol data in opposite directions;*

*a second LVDS channel comprising two sets of unidirectional, serial bit channels to transmit data in opposite directions;*

*a connector coupled to the first LVDS channel; and*

*a main memory directly coupled to the central processing unit.*

*22. The computer of claim 21 wherein the second LVDS channel communicates an encoded serial bit stream of address and data bits of a Peripheral Component Interconnect ("PCI") bus transaction.*

*23. The computer of claim 21 wherein the first LVDS channel conveys Universal Serial Bus (USB) Protocol data to a console through the connector.*

*24. A computer, comprising:*

*an integrated central processing unit and graphics controller in a single chip directly connected to a Low Voltage Differential Signal (LVDS) channel comprising two sets of unidirectional, serial bit channels to transmit data in opposite directions;*

*a main memory directly coupled to the integrated central processing unit and graphics controller;*

*a differential signal channel directly extending from the integrated central processing unit and graphics controller to convey digital video display information;*

*a connector for coupling to a console; and*

*a second differential signal channel comprising two sets of unidirectional, serial bit channels to transmit data in opposite directions, wherein the second differential signal channel conveys Universal Serial Bus (USB) protocol data through the connector to the console.*

*25. The computer of claim 24 wherein the LVDS channel conveys an encoded serial bit stream of address and data bits of a Peripheral Component Interconnect ("PCI") bus transaction.*

*26. A modular computer system, comprising:*

*a console comprising a first Low Voltage Differential Signal (LVDS) channel comprising two sets of unidirectional, serial bit channels to transmit data in opposite directions; and*

*a computer coupled to the console through a connector, the computer comprising*

*a central processing unit,*

*a mass storage unit coupled to the central processing unit,*

*a second LVDS channel comprising two sets of unidirectional, serial bit channels to transmit data in opposite directions, and*

*a peripheral bridge directly coupled to the central processing unit without any intervening Peripheral Component Interconnect bus, wherein the peripheral bridge directly conveys an encoded serial bit stream of address and data bits of a Peripheral Component Interconnect ("PCI") bus transaction over the second LVDS channel; and*

*wherein the second LVDS channel communicates to the first LVDS channel in the console upon the computer coupling to the console.*

*27. The modular computer system of claim 26 wherein the second LVDS channel conveys the encoded serial bit stream of the PCI bus transaction to the first LVDS channel upon coupling of the computer module to the console.*

*28. The modular computer system of claim 27 wherein the console further comprises a mass storage device that couples to the first and second LVDS channels.*

*29. A modular computer system, comprising:*

*a console comprising a power supply; and*

*a computer coupled to the console through a connector, the computer comprising*

*a central processing unit,*

*a first Low Voltage Differential Signal (LVDS) channel comprising two sets of unidirectional, multiple serial bit channels to transmit data in opposite directions,*

*a peripheral bridge directly coupled to the first LVDS channel to communicate an encoded serial bit stream of address and data bits of a Peripheral Component Interconnect ("PCI") bus transaction, the peripheral bridge directly coupled to the central processing unit without any intervening PCI bus, and*

*wherein the power supply supplies power to the computer upon coupling to the console.*

*30. The computer system of claim 29 further comprising a second LVDS channel that conveys the encoded serial bit stream of address and data bits of the PCI bus transaction, wherein the second LVDS channel directly extends from the central processing unit.*

*31. A modular computer system, comprising:*

*a console comprising a first Low Voltage Differential Signal (LVDS) channel comprising two sets of unidirectional, serial bit channels to transmit data in opposite directions; and*

*a computer that couples to the console, the computer comprising*

*an integrated central processing unit and graphics controller in a single chip, directly connected to a second LVDS channel comprising two sets of unidirectional, serial bit channels to transmit data in opposite directions, and*

*a connector that couples to the first LVDS channel in the console.*

*32. The modular computer system of claim 31 wherein the second LVDS channel conveys an encoded serial bit stream of address and data bits of a Peripheral Component Interconnect ("PCI") bus transaction.*

*33. The modular computer system of claim 31 wherein the first LVDS channel conveys an encoded serial bit stream of address and data bits of a Peripheral Component Interconnect ("PCI") bus transaction.*

*34. The modular computer system of claim 31 wherein the computer conveys Universal Serial Bus (USB) protocol data to the console upon the computer coupling to the console.*

*35. A computer, comprising:*

*a central processing unit;*

*a main memory directly connected to the central processing unit;*

*a peripheral bridge directly coupled to the central processing unit without any intervening Peripheral Component Interconnect (PCI) bus, wherein the peripheral bridge directly conveys an encoded serial bit stream of address and data bits of a Peripheral Component Interconnect (PCI) bus transaction over a first Low Voltage Differential Signal (LVDS) channel comprising two sets of unidirectional, serial bit channels to transmit data in opposite directions; and*

*a mass storage device directly coupled the peripheral bridge.*

*36. The computer of claim 35 further comprising a graphics controller coupled to the peripheral bridge.*

*37. A computer, comprising:*

*a central processing unit directly connected to a first Low Voltage Differential Signal (LVDS) channel to convey a first encoded serial bit stream of address and data bits of a Peripheral Component Interconnect (PCI) bus transaction;*

*a main memory directly connected to the central processing unit; and*

*a peripheral bridge directly coupled to the central processing unit without any intervening PCI bus, wherein the peripheral bridge directly conveys a second encoded serial bit stream of address and data bits of a (PCI) bus transaction over a second LVDS channel comprising two sets of unidirectional, serial bit channels to transmit data in opposite directions.*

*38. The computer of claim 37 further comprising a connector coupled to a console, wherein the second LVDS channel communicates the second encoded serial bit stream of address and data bits of the PCI bus transaction to the console.*

*39. The computer of claim 38 further comprising a graphics controller to convey digital video display information from the connector to the console.*

*40. The computer of claim 38 wherein the console comprises a peripheral device that couples to the second LVDS channel.*

*41. A computer, comprising:*

*an integrated central processing unit and graphics controller in a single chip directly connected to a first Low Voltage Differential Signal (LVDS) channel comprising two sets of unidirectional, serial bit channels to transmit data in opposite directions, wherein the integrated central processing unit and graphics controller conveys digital video display signals through a second differential signal channel;*

*a main memory directly coupled to the integrated central processing unit and graphics controller; and*

*a mass storage device comprising flash memory.*

*42. The computer of claim 41 wherein the second differential signal channel conveys Transition Minimized Differential Signaling (TDMS) information.*

*43. The computer of claim 41 wherein the first LVDS channel conveys an encoded serial bit stream of address and data bits of a Peripheral Component Interconnect (PCI) bus transaction.*

*44. A computer, comprising:*

*an integrated central processing unit and graphics controller in a single chip directly connected to a first Low Voltage Differential Signal (LVDS) channel comprising two sets of unidirectional, serial bit channels to transmit data in opposite directions;*

*a main memory directly coupled to the integrated central processing unit and graphics controller;*

*a mass storage device comprising flash memory;*

*a connector that conveys Universal Serial Bus (USB) protocol information to a console; and*

*a second LVDS channel comprising two sets of unidirectional, serial bit channels to transmit data in opposite directions, wherein the second LVDS channel conveys said USB protocol information to the console through the connector.*

*45. A computer, comprising:*

*a Central Processing Unit (CPU) directly connected to a Low Voltage Differential Signal (LVDS) channel comprising two sets of multiple, unidirectional, serial bit channels to convey an encoded serial bit stream of encoded address and data bits of a Peripheral Component Interconnect ("PCI") bus transaction in opposite directions;*

*a main memory directly connected to the CPU; and*

*a mass storage device coupled to the CPU.*

*46. The computer of claim 45 further comprising a connector, wherein the connector connects to a console comprising a power supply, and the power supply supplies power to the computer upon coupling to the console.*

*47. The computer of claim 45 wherein the mass storage device comprises flash memory.*

*48. A computer, comprising:*

*an integrated central processing unit and graphics controller in a single chip directly connected to a first Low Voltage Differential Signal (LVDS) channel comprising two sets of multiple, unidirectional, serial bit channels to convey an encoded serial bit stream of encoded address and data bits of a Peripheral Component Interconnect (PCI) bus transaction in opposite directions;*

*a main memory directly coupled to the integrated central processing unit and graphics controller; and*

*an Ethernet communication device coupled to the first LVDS channel.*

*49. The computer of claim 48 further comprising a connector, wherein the connector connects to a console comprising a power supply, and the power supply supplies power to the computer upon coupling to the console.*

* * * * *